United States Patent
Yoshida et al.

(10) Patent No.: US 6,801,546 B1
(45) Date of Patent: *Oct. 5, 2004

(54) METHOD FOR SETTING DESTINATION, COMMUNICATION APPARATUS, AND NETWORK SYSTEM USING THE METHOD

(75) Inventors: Takehiro Yoshida, Tokyo (JP); Akemi Nishimaki, Kawasaki (JP); Toru Ikeda, Abiko (JP)

(73) Assignee: Canon Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,398

(22) Filed: Dec. 22, 1998

(30) Foreign Application Priority Data

Dec. 25, 1997 (JP) .............................................. 9-357272
Jan. 30, 1998 (JP) .......................................... 10-019720
Jan. 30, 1998 (JP) .......................................... 10-019721

(51) Int. Cl.[7] ........................... H04J 1/00; H04L 12/66; H04M 11/00; H04N 1/00
(52) U.S. Cl. ...................... 370/490; 370/352; 370/400; 379/100.08; 379/100.09; 358/402
(58) Field of Search ...................... 379/100.08, 100.09, 379/88.17, 100.13; 358/402, 407, 403; 370/353, 354, 400, 401, 465–467, 421, 297, 298, 299, 264, 265, 270, 221, 229; 329/100.12, 266.02, 309; 709/203, 238, 218

(56) References Cited

U.S. PATENT DOCUMENTS

| | | | | |
|---|---|---|---|---|
| 5,812,278 A | * | 9/1998 | Toyoda et al. | 358/402 |
| 5,859,967 A | * | 1/1999 | Kaufeld et al. | 709/200 |
| 5,881,233 A | * | 3/1999 | Toyoda et al. | 709/233 |
| 6,023,470 A | * | 2/2000 | Lee et al. | 370/401 |
| 6,097,797 A | * | 8/2000 | Oseto | 379/100.08 |
| 6,208,638 B1 | * | 3/2001 | Rieley et al. | 370/354 |

* cited by examiner

*Primary Examiner*—Hanh Nguyen
(74) *Attorney, Agent, or Firm*—Morgan & Finnegan, LLP

(57) ABSTRACT

A communication apparatus includes a first relay destination assignment portion that assigns a first relay destination for relaying transmission data, a second relay destination assignment portion that assigns a second relay destination for transferring the transmission data from the first relay destination to the second relay destination, and a final destination assignment portion that assigns a final destination to which the transmission data are transferred from the second relay destination.

8 Claims, 34 Drawing Sheets

FIG.5A

| TELEPHONE NUMBER CONTROL TABLE | | 5-1 |
|---|---|---|
| No. 1 | Name:Can FUKUOKA A | 5-2 |
| | Tel No:078-901-2345 | 5-3 |
| | TX mode:ELECTRONIC MAIL RELAY TRANSMISSION | 5-4 |
| | Relay address:03-4567-8901 | 5-5 |
| | No. 2 Relay address:fukuo@ccc.bbb.dd.ee | 5-6 |
| No. 2 | Name:Can TOKYO B | |
| | Tel No:03-4567-8901 | |
| | TX mode:FACSIMILE TRANSMISSION | |
| No. 3 | | |

FIG.5B

| RELAY TRANSMISSION REGISTRATION DATA | | 5-7 |
|---|---|---|
| 07X | Relay address:03-4567-8901 | 5-8 |
| | No. 2 Relay address:fukuo@ccc.bbb.dd.ee | 5-9 |
| 01X | Relay address: | |

FIG.11

```
Date       :26 Aug 76 1430 EDT
From       :P. J. CROSS<tokyo@aaa.bbb.co.jp>
Sender     :tokyo@aaa.bbb.co.jp
To         :fukuo@ccc.bbb.co.jp
Message-ID :<some.string@SHOST>
```

```
MIME-Ver. *.*
Content-Type :Multipart/mixed;char-set=ISO-2022-jp;bouundary=----
[command]
command =none
option  =fax cover sheet type a
Password =*********
[end of command]
```

FIG.12

```
Date       :26 Aug 76 1430 EDT
From       :P. J. CROSS<tokyo@aaa.bbb.co.jp>
Sender     :tokyo@aaa.bbb.co.jp
To         :fukuo@ccc.bbb.co.jp
Message-ID :<some.string@SHOST>
```

```
MIME-Ver. *.*
Content-Type :Multipart/mixed;char-set=ISO-2022-jp;bouundary=----
[command]
command =relay 078-901-2345
option  =fax cover sheet type a
Password =*********
[end of command]
```

FIG.18

| TELEPHONE NUMBER REGISTRATION TABLE | | 5-1 |
|---|---|---|
| No. 1 | Name:MONTMARTORE | 5-2 |
| | Tel No:001-33-1-19-39-**** | 5-3 |
| | TX mode:ELECTRONIC MAIL RELAY TRANSMISSION | 5-4 |
| | Relay address:03-4567-8901 | 5-5 |
| No. 2 | Name:GANON TOKYO B | |
| | Tel No:03-4567-8901 | |
| | TX mode:TRANSMISSION | |

FIG.24

| | |
|---|---|
| Date | :26 Aug 96 1430 EDT |
| From | :P. J. CROSS<2012@***.ganon.co.jp> |
| Sender | :2012@***.ganon.co.jp |
| To | :pari@*.*.co.fr |
| Message-ID | :<some.string@SHOST> |

MIME-Ver.*.*

Content-Type:Multipart/mixed;char-set=ISO-2022-jp;boundary=---

[command]

command=relay 33-1-19-39-**** option =fax cover sheet type a

Password=**********

[end of command]

FIG.26

| COUNTRY CODE | TELEPHONE NUMBER | ELECTRONIC MAIL ADDRESS | COUNTRY CODE OF THE NEIGHBORING COUNTRY THAT RELAYS |
|---|---|---|---|
| 1 | 516 ****** | @...com | |
| 1 | 714 ****** | @...com | 52 |
| 1 | 804 ****** | @...com | |
| 81 | 03 ****** | @...jp | |
| 81 | 045 ****** | @...jp | |
| 81 | 06 ****** | @...jp | |
| 81 | 090 **** | @...jp | |
| 33 | 14939 ** | @...fr | 44, 34 |
| 33 | 14904 ** | @...fr | 31, 39, 49 |
| ⋯ | ⋯ | ⋯ | ⋯ |

FIG.27

| DEFAULT (A GENERAL INTERNATIONAL TELEPHONE IDENTIFICATION) |
|---|
| 001<br>0041 |
| USER ADDITION (AN INTERNATIONAL TELEPHONE IDENTIFICATION CONTRACTED INDEPENDENTLY) |
| 0120--** |

FIG.28

| COUNTRY CODE | TELEPHONE NUMBER | ELECTRONIC MAIL ADDRESS |
|---|---|---|
| 81 | 03 ***** | @...jp |

METHOD FOR SETTING DESTINATION, COMMUNICATION APPARATUS, AND NETWORK SYSTEM USING THE METHOD

BACKGROUND OF THE INVENTION

1. Field of the Invention

The present invention relates to a method for setting a destination in a communication apparatus such as a facsimile that can communicate with other communication apparatuses via a computer network including a public network such as the ISDN or the PSTN, and the Internet. The present invention also relates to a communication apparatus and a network system using the method.

2. Description of the Related Art

Network environments have been maintained well these days, so that communication such as an electronic mail connecting LANs with each other via the Internet has become popular. This communication via the Internet has an advantage in low cost. Therefore, even in facsimile or other communications, it is expected to utilize the communication via the Internet.

For example, there was a method of facsimile communication that aimed at reduction of cost required for broadcast communication from a source to plural destinations by sending an image to a relay station, which sends the received image to plural destinations.

However, the above-mentioned technique requires double communication cost for facsimile between the source and the relay station as well as between the relay station and broadcast destinations. This method cannot contribute reduction of the communication cost by a single relay station.

In addition, when using the Internet for the facsimile communication, facsimile machines having totally different configurations have to be prepared. Conventional facsimile machines cannot be used for the communication using the Internet.

The above-mentioned data communication via the Internet is available for a subscriber's terminal when a service provider that is connected to the public telephone network (or the ISDN) performs a service of connecting the subscriber's terminal with the Internet. Therefore, the facsimile communication via the Internet can be realized by connecting a facsimile machine as a subscriber's terminal to the Internet via the service provider when the facsimile machine is connected to the public telephone network. However, a typical facsimile machine does not have a function to send address information for the electronic mail to the service provider. Therefore, there was a problem that the service provider cannot send the image data properly to the destination terminal when using the conventional facsimile machine as a subscriber's terminal.

In addition, when the service provider that is connected to the receiving facsimile machine (receiver) receives image data for the receiver (image data that were sent from the source terminal via facsimile communication), the image data are stored in a memory device of the service provider, and the stored image data are sent to the receiver when the receiver as a subscriber requests to send the image data. Therefore, the image data does not reach the receiver before the receiver requests the image data. This means that the image data reaches with a substantial delay compared with conventional facsimile communication between terminals via the public telephone network, and that the source terminal cannot know when the image data reached the receiver.

SUMMARY OF THE INVENTION

An object of the present invention is to reduce the cost of the facsimile communication between a source facsimile machine and a destination facsimile machine by using a network such as the Internet even if there is only one destination. Another object of the present invention is to facilitate communication between communication apparatuses that are connected to a network including the public circuit and a network circuit.

It is also another object to enable source machine to set easily of destinations of a first relay station, a second relay station and a receive side facsimile machine, when sending image data from the source facsimile machine to the first relay station that is connected to the Internet via the public circuit, sending the image data from the first relay station to the second relay station via the Internet, and sending the image data from the second relay station to the receive side facsimile machine that is connected to the public circuit.

It is still another object to communicate widely with facsimile machines having the standard communication functions without designing new non-standard protocol.

In order to attain the above-mentioned objects, a communication apparatus of the present invention comprises first relay destination assignment means for assigning a first relay destination that relays transmission data, second relay destination assignment means for assigning a second relay destination that transfers the transmission data from the first relay destination to the second relay destination, and final destination assignment means for assigning a final destination to which the transmission data are transferred from the second relay destination.

Preferably, the first relay destination is assigned by data indicating a telephone number, the second relay destination is assigned by data indicating an electronic mail address, and the final destination is assigned by data indicating a telephone number. The apparatus preferably comprises transmission means for sending data indicating the second relay destination and the final destination to the first relay destination by a facsimile procedure. The transmission means send the data indicating the second relay destination and the final destination by a sub-address defined in ITU-T T30. Furthermore, the apparatus comprises first registration means for registering the first and/or second relay destinations in connection with the final destination. The apparatus also comprises second registration means for registering the first and/or second relay destinations in connection with the final destination when the first and/or second relay destinations are not registered in the first registration means. Furthermore, the apparatus comprises first selection means for selecting to activate the first and the second relay destination assignment means or not. In addition, the apparatus comprises second selection means for selecting to activate the final destination assignment means or not. Preferably, the communication apparatus is a facsimile machine.

A communication apparatus having a relay function according to the present invention comprises reception means for receiving at least a sub-address and transmission data, extracting means for extracting a relay destination for transferring the transmission data to a next relay destination and/or a final destination for transferring the transmission data from the next relay destination to the final destination, from the sub-address, and transmission means for making an electronic mail including the transmission data and the final destination, and sending the electronic mail to the relay destination. Preferably, the sub-address is defined by ITU-T T30 and the final destination is stored in a command region of a file described in MIME.

A communication apparatus having a relay function according to the present invention comprises reception means for receiving an electronic mail including at least a final destination and transmission data, extracting means for extracting a final destination to which the transmission data is transferred, from a received electronic mail data, and transmission means for sending the transmission data to the final destination. Preferably, the final destination is stored in a command region of a file described in MIME.

A communication apparatus having a relay function according to the present invention comprises first reception means for receiving at least a sub-address and transmission data, first extracting means for extracting a relay destination for transferring the transmission data to a next relay destination and/or a final destination for transferring the transmission data from the next relay destination to the final destination, from the sub-address, first transmission means for making an electronic mail including the transmission data and the final destination, and sending the electronic mail to the relay destination, second reception means for receiving an electronic mail including at least a final destination and transmission data, second extracting means for extracting a final destination to which the transmission data is transferred, from a received electronic mail data, and second transmission means for sending the transmission data to the final destination. Preferably, the sub-address is defined by ITU-T T30 and the final destination is stored in a command region of a file described in MIME. In addition, the communication apparatus having a relay function is a facsimile machine.

A network system according to the present invention is a system to which at least a source communication apparatus, a communication apparatus having a relay function working as a first relay station, a communication apparatus having a relay function working as a second relay station, and a destination communication apparatus are connected. The source communication apparatus includes first relay destination assigning means for assigning a first relay destination that relays a transmission data, second relay destination assigning means for assigning a second relay destination for transferring the transmission data from the first relay destination to the second relay destination, final destination assigning means for assigning a final destination to which the transmission data is transferred from the second relay destination, and third transmission means for sending at least the transmission data and a sub-address including the second relay destination and the final destination. The communication apparatus having a relay function working as a first relay station includes first reception means for receiving at least a sub-address and transmission data, first extracting means for extracting a relay destination for transferring the transmission data to a next relay destination and/or a final destination for transferring the transmission data from the next relay destination to the final destination, from the sub-address, and first transmission means for making an electronic mail including the transmission data and the final destination, and sending the electronic mail to the relay destination. The communication apparatus having a relay function working as a second relay station includes second reception means for receiving an electronic mail including at least a final destination and transmission data, second extracting means for extracting a final destination to which the transmission data is transferred, from a received electronic mail data, and second transmission means for sending the transmission data to the final destination. Preferably, the first relay destination is assigned by data indicating a telephone number, the second relay destination is assigned by data indicating an electronic mail address, the final destination is assigned by data indicating a telephone number, the sub-address is defined by ITU-T T30, and the final destination is stored in a command region of a file described in MIME.

A method for setting a destination in a communication apparatus according to the present invention comprises the steps of reading out first and/or second relay destinations registered in connection with a final destination, when the final destination is inputted for sending a transmission data, and sending data indicating the second relay destination and the final destination to the first relay destination by facsimile procedure. Preferably, the communication apparatus is a facsimile machine, the final destination is inputted as data indicating a telephone number, the first relay destination is registered as data indicating a telephone number, and the second relay destination is registered as data indicating an electronic mail address.

A method for setting a destination in a network system according to the present invention is a method applied to a network system to which at least a source communication apparatus, a communication apparatus having a relay function working as a first relay station, a communication apparatus having a relay function working as a second relay station, and a destination communication apparatus are connected. In the source communication apparatus, the method comprises the steps of reading out first and/or second relay destinations registered in connection with a final destination, when the final destination is inputted for sending a transmission data, and sending data indicating the second relay destination and the final destination to the first relay destination by facsimile procedure. In the communication apparatus having a relay function working as a first relay station, the method comprises the steps of extracting the second relay destination for transferring the transmission data and the final destination for transferring the transmission data from the second relay destination, from a received sub-address, and making an electronic mail including the final destination, and sending the electronic mail to the second relay destination. In the communication apparatus having a relay function working as a second relay station, the method comprises the steps of extracting a final destination to which the transmission data is transferred, from a received electronic mail data, and sending the transmission data to the final destination. Preferably, the communication apparatus is a facsimile machine, the final destination is inputted as data indicating a telephone number, the first relay destination is registered as data indicating a telephone number, the second relay destination is registered as data indicating an electronic mail address, the sub-address is defined by ITU-T T30 and the final destination is stored in a command region of a file described in MIME.

A storage medium according to the present invention stores a control program that can be read out by a computer for controlling a communication apparatus. The control program comprising at least a reader module for reading out first and/or second relay destinations registered in connection with a final destination, when the final destination is inputted for sending a transmission data, and a transmission module for sending data indicating the second relay destination and the final destination to the first relay destination by facsimile procedure. Preferably, the medium further stores a management table for registering the first and/or second relay destinations in connection with a final destination.

A storage medium according to the present invention stores a control program that can be read out by a computer for controlling a communication apparatus having a relay function. The control program comprising at least a first extracting module for extracting a second relay destination for transferring the transmission data and the final destination to which the transmission data is transferred from the second relay destination, from a received sub-address, a first transmission module for making an electronic mail including the final destination, and sending the electronic mail to the second relay destination, a second extracting module for extracting a final destination to which the transmission data is transferred, from a received electronic mail data, and a second transmission module for sending the transmission data to the final destination. Preferably, the control program further stores a management table for registering the first and/or second relay destinations in connection with a final destination.

Furthermore, a communication control device according to the present invention controls communication between communication apparatuses connected to a network environment including a public line and a computer network. The device comprises reception means for receiving image data including a destination data indicating a destination of the data sent by a source communication apparatus, judging means for judging whether the destination data received by the reception means is data indicating an electronic mail address or data indicating a telephone number, and control means for controlling communication to the destination of the image data in accordance with the judgement result of the judging means.

Preferably, the control means convert the image data into a image data having a file format that can be transmitted by electronic mail, when the judging means judged that the destination data is data indicating an electronic mail address.

Preferably, the control means set a transmission mode of the image data to an "electronic mail relay transmission" when the judging means judged that the destination data was data indicating an electronic mail address, while if the destination data was judged to be a telephone number, the control means set a transmission mode of the image data to a "facsimile transmission".

Preferably, the control means include a memory means for memorizing a relay destination table for managing a relay destination information of the image data, and verify the judgement result of the judging means and the relay destination table, so as to control communication to the destination of the image data in accordance with the verification result.

Preferably, the relay destination information includes at least a country information indicating a relay destination country, an area information indicating an area in the country, and a corresponding electronic mail address.

Preferably, the control means obtain the country information indicating a destination country from the destination data, obtain a destination having the obtained country code from the relay destination table, and set a mode of transmission to the obtained relay destination into a "electronic mail relay transmission".

Preferably, the control means further decide one relay destination in accordance with each area information that the relay destination has, if plural relay destinations having the obtained country information exist in the relay destination table, and set a mode of transmission to the decide relay destination into a "electronic mail relay transmission".

Preferably, the control means send the image data to the destination indicated by the destination data by facsimile if the relay destination indicated by the relay destination information is the communication control device.

Preferably, the reception means receive the destination data by facsimile communication procedure.

Preferably, the facsimile communication procedure utilizes a sub-address defined in ITU-T T30.

According to another aspect of the present invention, a method for controlling communication between communication apparatuses connected to a network environment including a public line and a computer network is provided. The method comprises the steps of receiving image data including a destination data indicating a destination of the data sent by a source communication apparatus, judging whether the destination data received in the receiving step is data indicating an electronic mail address or data indicating a telephone number, and controlling communication to the destination of the image data in accordance with the judgement result of the judging step.

According to another aspect of the present invention, a memory storing program codes of a control program that can be read out by a computer for controlling a communication between communication apparatuses connected to a network environment including a public line and a computer network is provided. The memory stores program codes of the step for receiving image data including a destination data indicating a destination of the data sent by a source communication apparatus, program codes of the step for judging whether the destination data received in the receiving step is data indicating an electronic mail address or data indicating a telephone number, and program codes of the step for controlling communication to the destination of the image data in accordance with the judgement result of the judging step.

According to an embodiment of the present invention, a facsimile machine is provided, which comprises means for accessing a service provider of the Internet, means for setting information in a facsimile communication procedure signal for requesting the service provider to do a facsimile transmission, and means for sending the facsimile communication procedure signals in which the setting means have set the information to the service provider, so as to send an image data by facsimile. Thus, communication of an image data via the Internet can be requested to a service provider of the Internet by facsimile communication of facsimile machine.

According to another embodiment of the present invention, a storage medium storing a computer program that can be executed by a computer is provided. The program comprises the steps of receiving an access request of the facsimile communication, receiving an information for sending image data via the Internet set in facsimile communication procedure signals, and extracting the received information, converting the image data received by facsimile communication into an electronic mail data in accordance with the extracted information, and sending the converted electronic mail data and information of a destination of facsimile transmission of the image data sent by the electronic mail to the other party assigned by the information. Thus, a facsimile machine can request to send an image data received from a facsimile machine by facsimile communication to the other service provider via the Internet as an electronic mail.

Other objects and embodiments of the present invention will be cleared by the following drawings and descriptions.

BRIEF DESCRIPTION OF THE DRAWINGS

FIGS. 5A and 5B show an example of registration control data for controlling the relay instruction transmission of the G3 facsimile performing the relay instruction transmission according to the embodiment of the present invention.

FIG. 11 shows an example of data content of a MIME file in the electronic mail produced by the electronic mail facsimile of the first relay station according to the embodiment of the present invention.

FIG. 12 shows an example of data content of a MIME file in the relay electronic mail produced by the electronic mail facsimile of the first relay station according to the embodiment of the present invention.

FIG. 18 shows an example of the registration control table according to the embodiment of the present invention.

FIG. 24 shows an example of a command according to the embodiment of the present invention.

FIG. 26 shows an example of a relay destination table according to the embodiment of the present invention.

FIG. 27 shows an example of an international telephone identification table according to the embodiment of the present invention.

FIG. 28 shows an example of a first relay station table according to the embodiment of the present invention.

DESCRIPTION OF THE PREFERRED EMBODIMENTS

Hereinafter, preferred embodiments of the present invention will be described in detail with reference to the accompanying drawings.

Example of a Network

Figure 1:
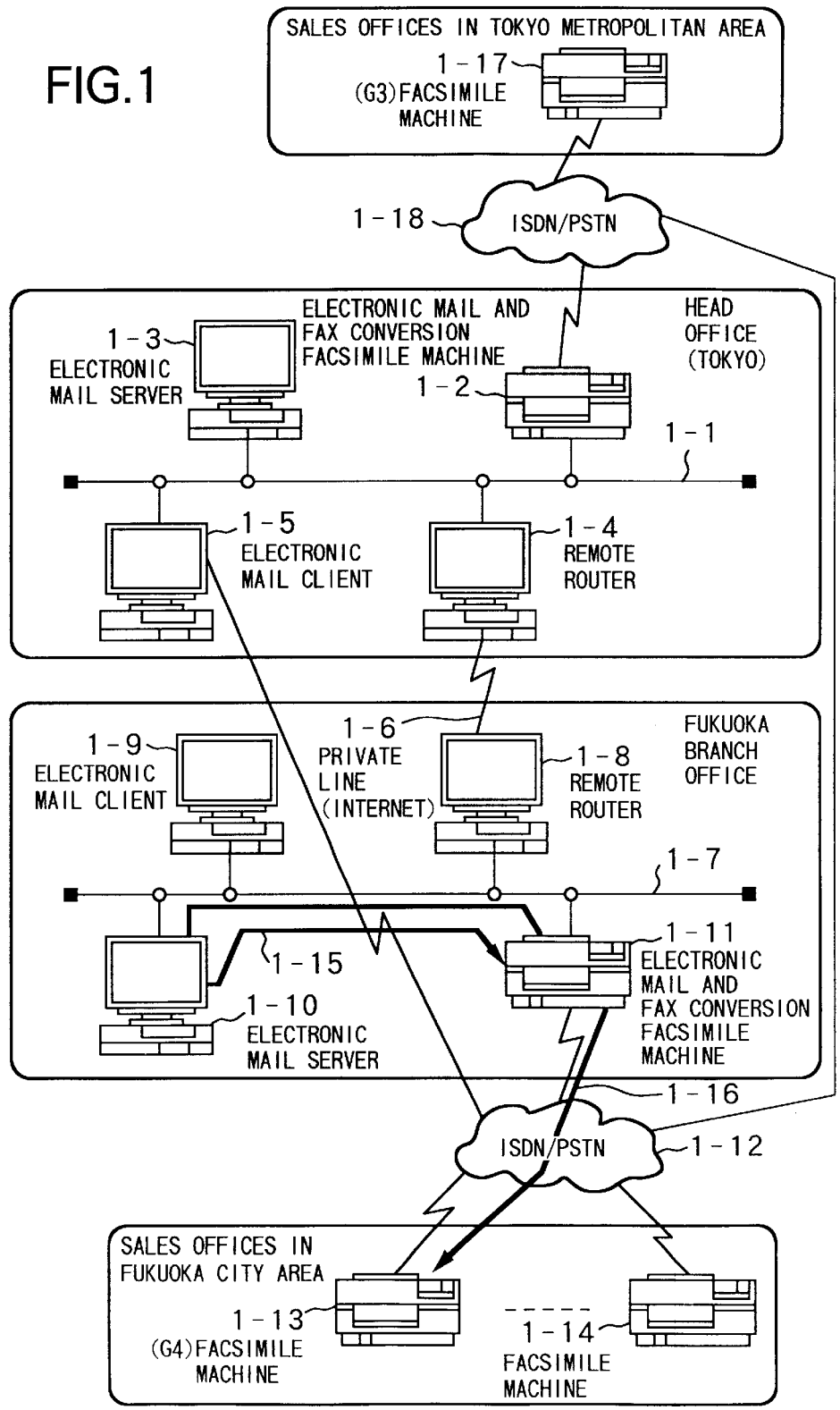
FIG. 1 shows a configuration of a network system including facsimile machines and electronic mail facsimile machines according to an embodiment of the present invention.

FIG. 1 shows a configuration of a network system in which a facsimile machine and an electronic mail facsimile machine are connected with each other. The electronic mail facsimile machine means a facsimile machine that has a conversion function between an electronic mail and a facsimile according to an embodiment of the present invention.

As shown in FIG. 1, the local area network (LAN) of the first head office (Tokyo) 1-1 includes an electronic mail facsimile machine 1-2, an electronic mail server 1-3, an electronic mail client PC (personal computer) 1-5 and a remote router 1-4 for connecting with Fukuoka branch office LAN via private line 1-6. In addition, the electronic mail facsimile machine 1-2 is connected with the public service telephone network (PSTN) or the integrated service digital network (ISDN) 1-18 so as to communicate with a facsimile machine 1-17 of a sales office in Tokyo metropolitan area.

On the other hand, the Fukuoka branch office LAN 1-17 includes a remote router 1-8 for connecting with the head office LAN, an electronic mail facsimile machine 1-11, an electronic mail server 1-10 and an electronic mail client PC 1-9. In addition, the electronic mail facsimile machine 1-11 is connected with the public service telephone network (PSTN) or the integrated service digital network (ISDN) 1-12 so as to communicate with facsimile machines 1-13 and 1-14 of sales offices in Fukuoka city area.

Figure 2:
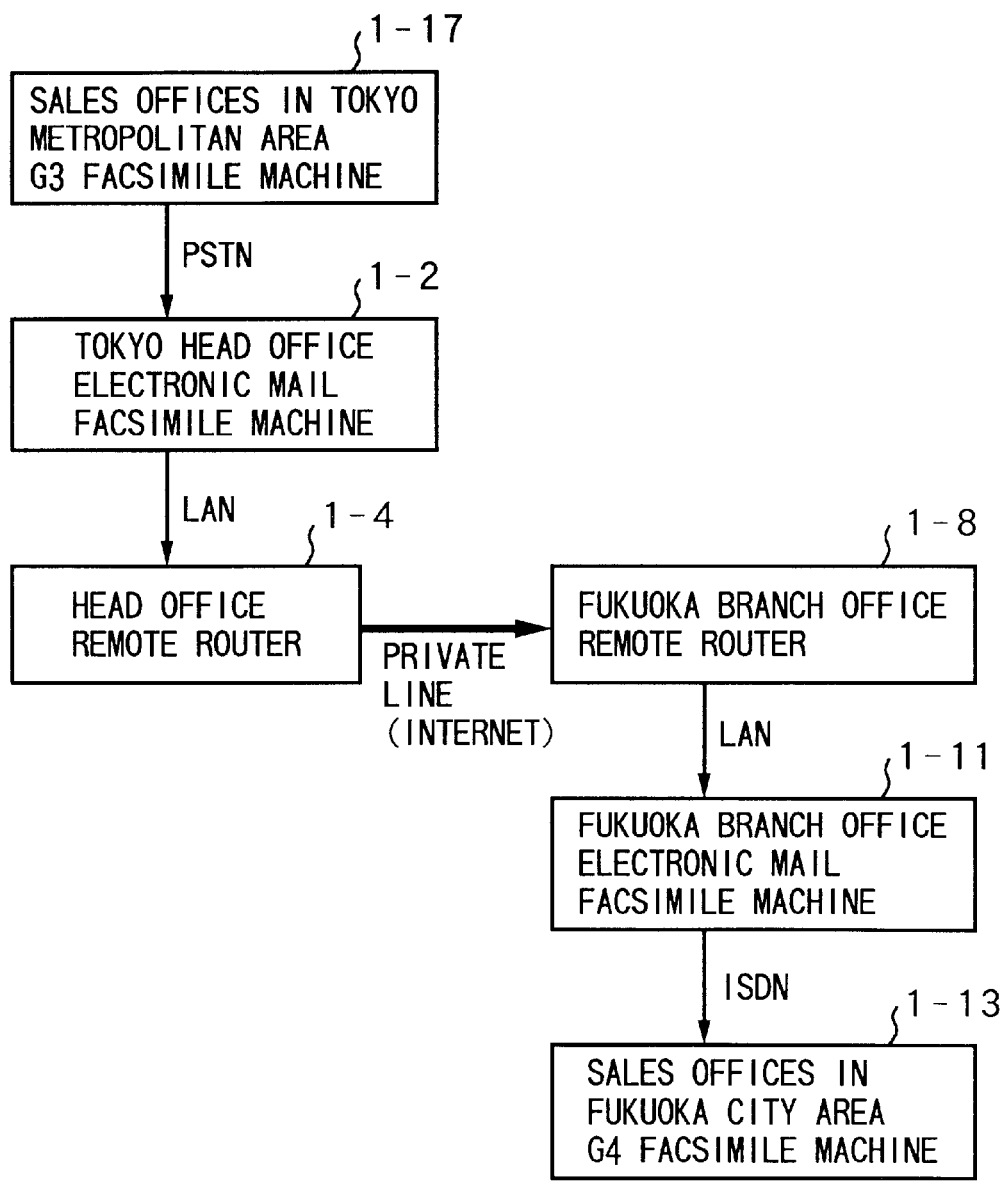
FIG. 2 shows a transmission path of the network system shown in FIG. 1.

In this embodiment, as shown in FIG. 2, the electronic mail facsimile machine 1-2 of a sales office in Tokyo metropolitan area is communicated with the electronic mail facsimile machine 1-11 of a sales office in Fukuoka city area via the private line or the Internet for communication from the facsimile machine 1-17 of the sales office in Tokyo metropolitan area to the facsimile machine 1-13 of the sales office in Fukuoka city area.

Example of Configuration of the Facsimile Machine

First, the operation of the G3 facsimile machine of the sales office in Tokyo metropolitan area, which is a relay instruction station, will be explained.

Figure 3:
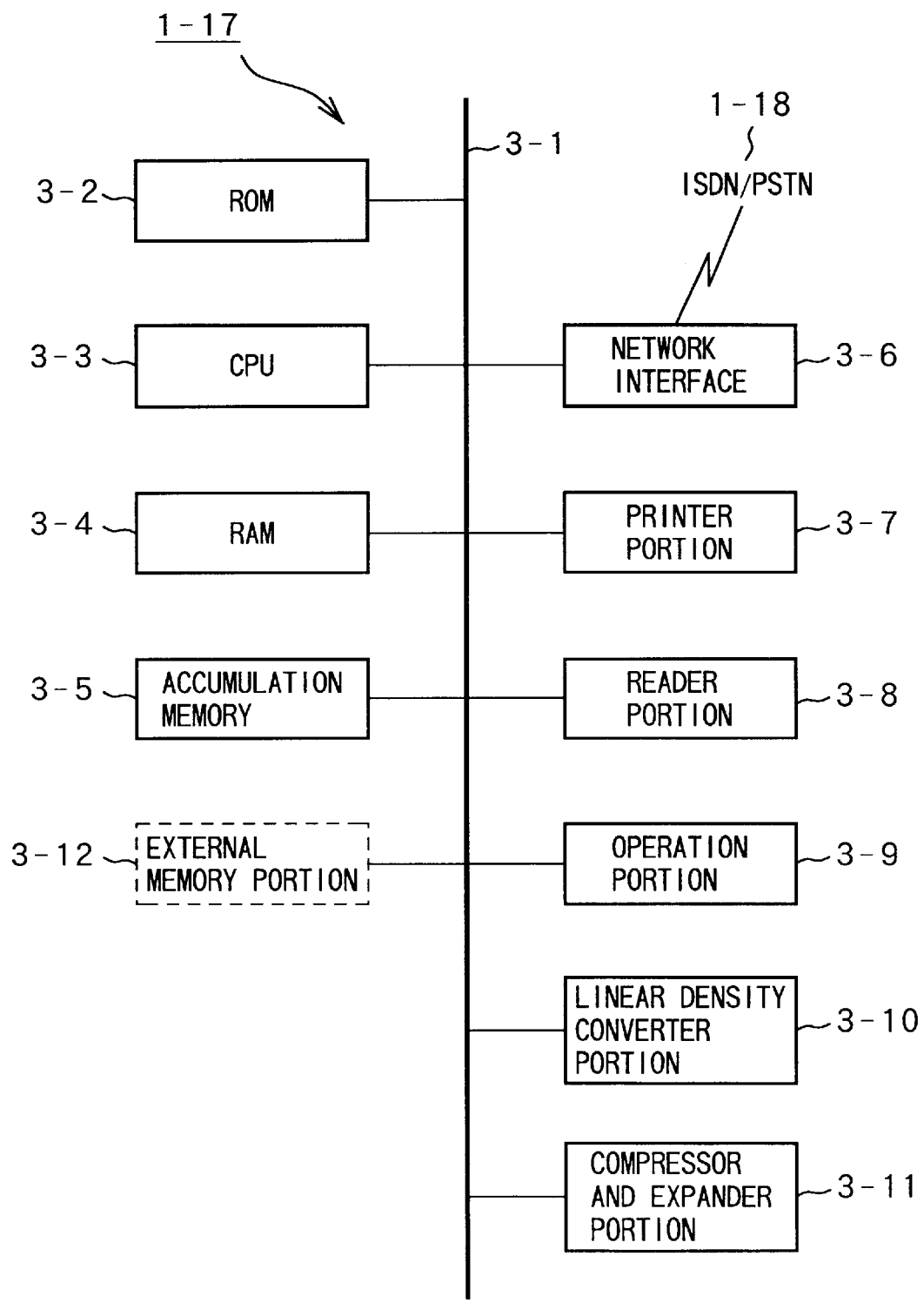
FIG. 3 is a block diagram of a relay instruction G3 facsimile machine according to the embodiment of the present invention.

FIG. 3 is a block diagram showing the configuration of the G3 facsimile machine 1-17 in accordance with the embodiment of the present invention.

In FIG. 3, each element is connected to the bus line 3-1. The read only memory (ROM) 3-2 stores a computer program (software for controlling the entire machine) performed by the central processing unit (CPU) 3-3. The CPU 3-3 controls the machine by performing the program, which is stored in the ROM 3-2, or is downloaded to the random access memory (RAM) 3-4.

The RAM 3-4 stores various kinds of data necessary for control, the registration control data shown in FIGS. 5A and 5B and the program. The accumulation memory 3-5 stores coded data of the facsimile communication, electronic mail data, scanning or printing image data. The accumulation memory 3-5 can be included in the RAM 3-4. The various kinds of data necessary for control, the registration control data and the program can be loaded from an external memory portion 3-12 mentioned below or downloaded from the electronic mail facsimile machine 1-2.

A network interface portion 3-6 includes a communication control unit (CCU) for performing communication via the ISDN network or the PSTN network 1-18, a modem, a network control unit (NCU) and others. The network interface portion 3-6 performs calling operation and communication operation to the network in accordance with the control by the CPU 3-3.

A printer portion 3-7 performs printing of facsimile received images, copy printing and other operations responding to a print request from the PC in accordance with the control by the CPU 3-3. A reader portion 3-8 performs scanning of a transmission image, copy scanning and other operations responding to a scan request from the PC in accordance with the control by the CPU 3-3. A operation portion 3-9 transmit key input information, various display information and other information to the control portion in accordance with the control by the CPU 3-3 so as to display depending on the operation.

An image linear density converter portion 3-10 performs conversion of image data resolution, conversion of page size and conversion of millimeters/inches. A compressor and expander portion 3-11 performs compression encoding such as MH, MR, MMR or JBIG of the image scanned by the reader portion 3-8 and performs expansion decoding of the encoded data that was received. An external memory portion 3-12 comprises a storage medium such as a flexible disk or a CD-ROM. The external memory portion 3-12 is used for storing the program and the registration control data shown in FIGS. 5A and 5B, which are loaded to RAM 3-4, the encoded data, electronic mail data, scanning or printing image data.

FIGS. 5A and 5B show an example of the registration control data for the relay instruction station, i.e., the G3 facsimile of the sales office 1-17 in Tokyo metropolitan area to perform transmission to the G3 facsimile 1-13 via the first relay station, i.e., the electronic mail facsimile machine 1-2 of Tokyo branch office and the second relay station, i.e., the electronic mail facsimile machine 1-11 of Fukuoka branch office.

The registration control data comprises two kinds of registration control data, which are a telephone number control table 5-1 and a relay transmission registration control data 5-7.

First, the telephone number control table will be explained. This table is destination data, which is searched by No. X or Name when the destination input is for a one-touch dialing or an abbreviated dialing, while it is searched by a telephone number when the destination input is the telephone number. The registration control data can be designated by an abbreviated destination name 5-2, a destination telephone number 5-3, a transmission mode 5-4, and if the transmission mode is "electronic mail relay transmission", by the first relay station 5-5 and the second transmission station 5-6.

The first relay station means a relay station such as the electronic mail facsimile machine 1-2 of Tokyo head office, which performs reception via the ISDN or the PSTN and sends the electronic mail via the private line or the Internet. The second relay station means a relay station such as the electronic mail facsimile machine 1-11 of Fukuoka branch office, which receives the electron mail via the private line or the Internet and performs transmission via the ISDN or the PSTN.

The first relay station 5-5 is assigned by a telephone number, e.g., "03-4567-8901". The second relay station 5-6 is assigned by an electronic mail address, e.g., "fukuo@ccc.bbb.dd.ee". Each of the first and second relay stations has to be an electronic mail facsimile machine. The telephone number 5-5 of the first relay station is used for destination of transmission, while the mail address 5-6 of the second relay station is given to the first relay station as relay data.

Next, the relay transmission control data 5-7 will be explained in detail.

If the destination is assigned by one-touch dialing or abbreviated dialing (or telephone number) and the content of the transmission mode registration is the "electronic mail relay mode", the first and second relay station address of the above-explained registration control data is used for relaying. However, if the first and second relay station address are not assigned, the first relay address 5-8 and the second relay address 5-9 of the relay transmission registration control data are used.

When the transmission mode is previously set in the "electronic mail relay mode" and the destination address is inputted, the first and second relay station addresses are used. The first relay station address 5-8 is for registration of a telephone number, while the second relay station address is for registration of an electronic mail address. The first and the second relay stations are assigned with electronic mail facsimiles.

The registration control data of this embodiment can be used with maintaining its structure and with an extension as below. For example, if the transmission mode is the "facsimile transmission", only the destination telephone number 5-3 is registered, while the first and second relay station addresses are not used. In addition, if the transmission mode is the "electronic mail transmission", the destination mail address is registered in the destination telephone number 5-3, while the second relay station address is not used. If the transmission mode is the "facsimile relay mode", the telephone number is registered in the second relay station address.

Figure 6:
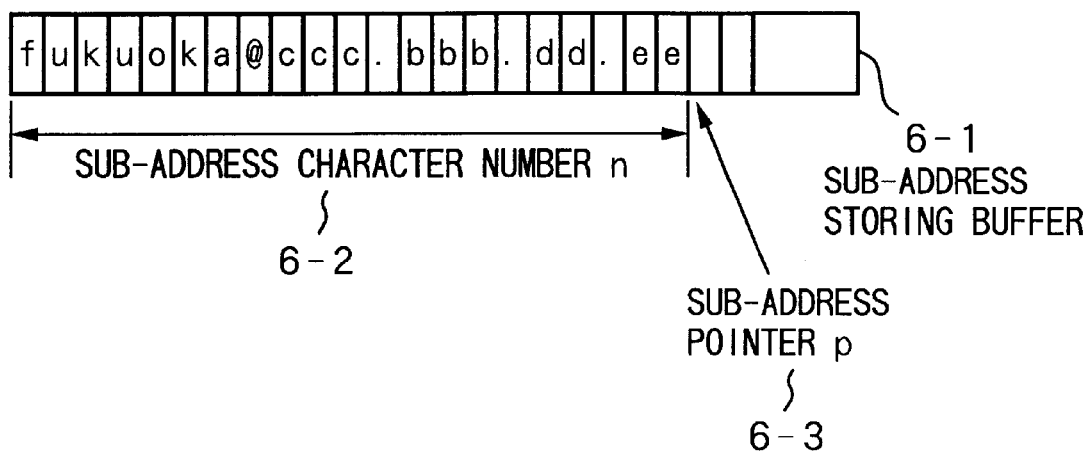
FIG. 6 shows a sub-address control data of the G3 facsimile performing the relay instruction transmission according to the embodiment of the present invention.

FIG. 6 shows a working area for deciding the content of the sub-address defined in ITU-T T30. The working area is provided in the RAM 3-4 and is referred to a sub-address storing buffer 6-1 hereinafter. Generation of the sub-address data is controlled by character number data 6-2 and a storage address pointer 6-3.

The sub-address storing buffer 6-1 stores the destination telephone number of the G4 facsimile machine 1-13 of the sales office in Fukuoka city area, which is a final reception station, and a mail address of the second relay station.

Figure 7:
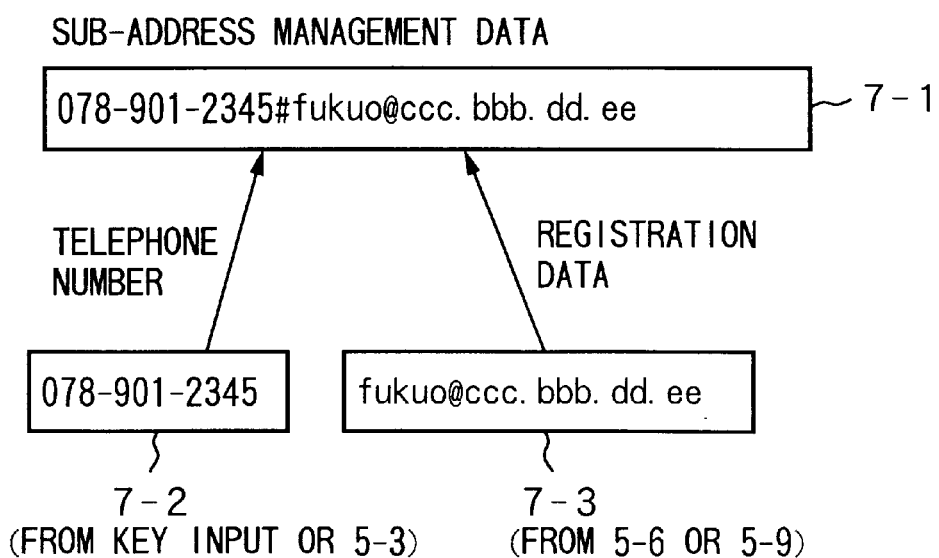
FIG. 7 shows an example of sub-address when performing the relay instruction transmission according to the embodiment of the present invention.

FIG. 7 shows an example of the above-mentioned configuration. When the destination telephone number 7-2 is fixed, the content of the telephone number is duplicated in the sub-address storing buffer, and the buffer pointer is incremented by the number of characters. If the second relay station is assigned, a delimiter "#" is added, the pointer is incremented by one, and the second relay station address 7-3 is duplicated in the address pointed by the pointer (7-1).

Example of the Operation Performed by the Facsimile Machine

Figure 4:
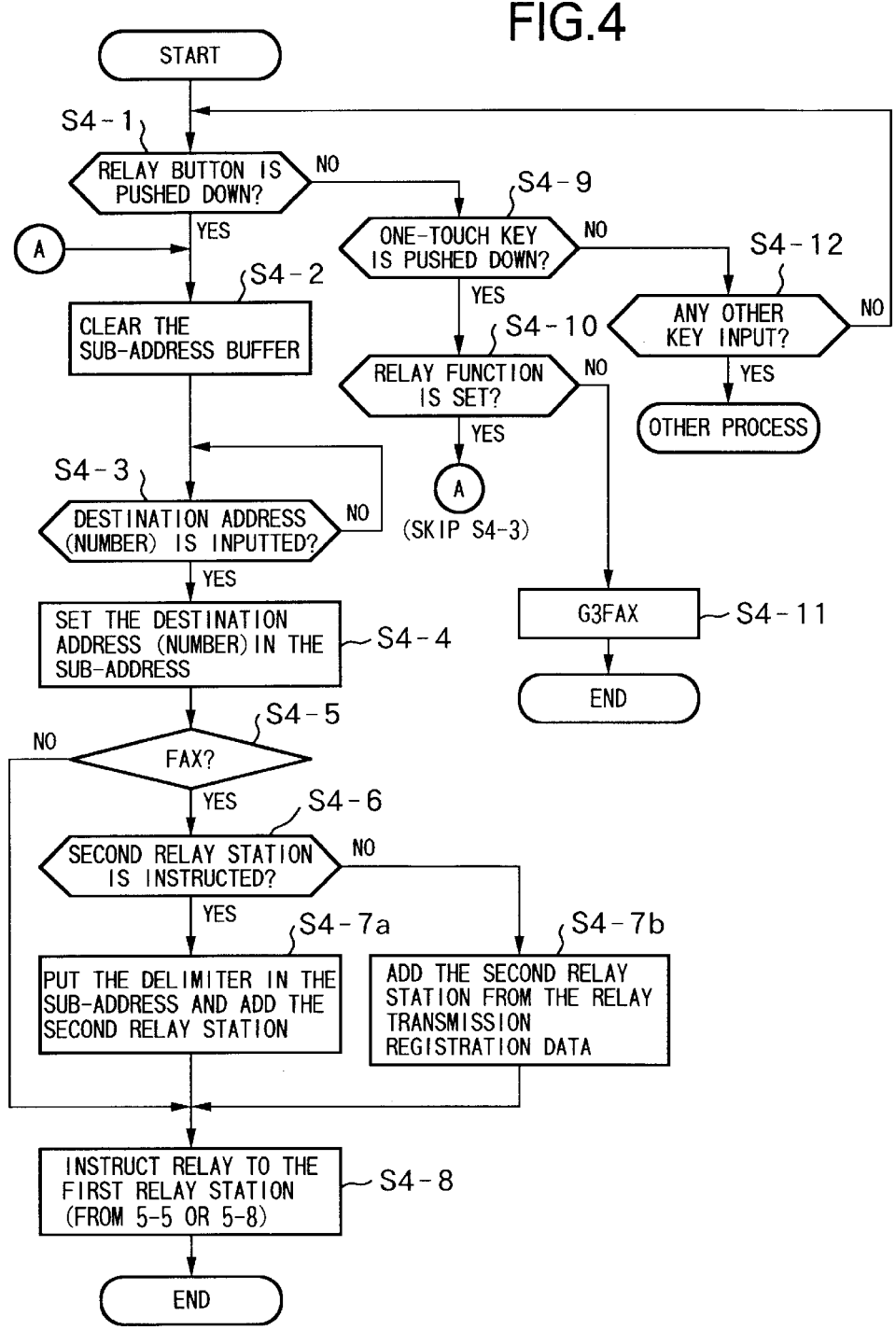
FIG. 4 is a flowchart of an operation of the G3 facsimile performing the relay instruction transmission according to the embodiment of the present invention.

FIG. 4 is a flowchart of the operation in which the relay instruction station, i.e., the sales office 1-17 in Tokyo metropolitan area instructs relay transmission so as to make reservation of the transmission to the destination via the electronic mail facsimile.

When an electronic mail relay button is pushed in key operation of the operation portion 3-9 of the instruction station, relay instruction transmission mode starts (S4-1).

In the relay mode, the sub-address storing buffer 6-1 is cleared with NULL, and control information of the character number data 6-2 and the storage address pointer 6-3 are initialized (S4-2). Then, input of the telephone number of the destination is waited (S4-3). The telephone number of the destination can be inputted by ten-key input, one-touch dialing or abbreviated dialing. In addition, the content of the destination may be either the telephone number or the electronic mail address.

When a destination address is inputted, the mail address is written into the sub-address storing buffer 6-1 (S4-4), and the destination address is checked if it is a telephone number or a mail address (S4-5). If it is a mail address, relay instruction transmission to the registered first relay station is performed (S4-8).

If the destination is a telephone number, the inputted destination telephone number is written into the sub-address storing buffer 6-1 (S4-5), and the control information is updated. After checking if the second relay station is instructed corresponding to the destination telephone number or not (S4-6), if the second relay station is instructed, the delimiter "#" is stored and the mail address of the second relay station is written (S4-7a). If the second relay station is not instructed, the mail address of the second relay station is read from the relay transmission registration data 57 and is written (S4-7b).

Then, calling to the first relay electronic mail facsimile 1-2 is performed, and the original image is read so as to start the relay transmission.

Next, the case in which the destination telephone number is registered as one-touch dialing, the transmission mode is the "electronic mail relay transmission", and the second relay electronic mail facsimile is assigned will be explained.

When the one-touch key is pushed down in key operation of the operation portion during stand-by state (S4-9), the registration content of the one-touch dialing is referred so that the electronic mail relay mode is checked being set or not (S4-10). If the relay mode is not set, the normal G3 transmission is performed (G4 -11). If the relay mode is set, the above-explained steps S4-2 to S4-8 are performed (the step S4-3 is skipped).

If the other key or button is inputted (S4-12), the other corresponding process is performed (S4-13).

Example of the Electronic Mail Facsimile Machine

Figure 8:
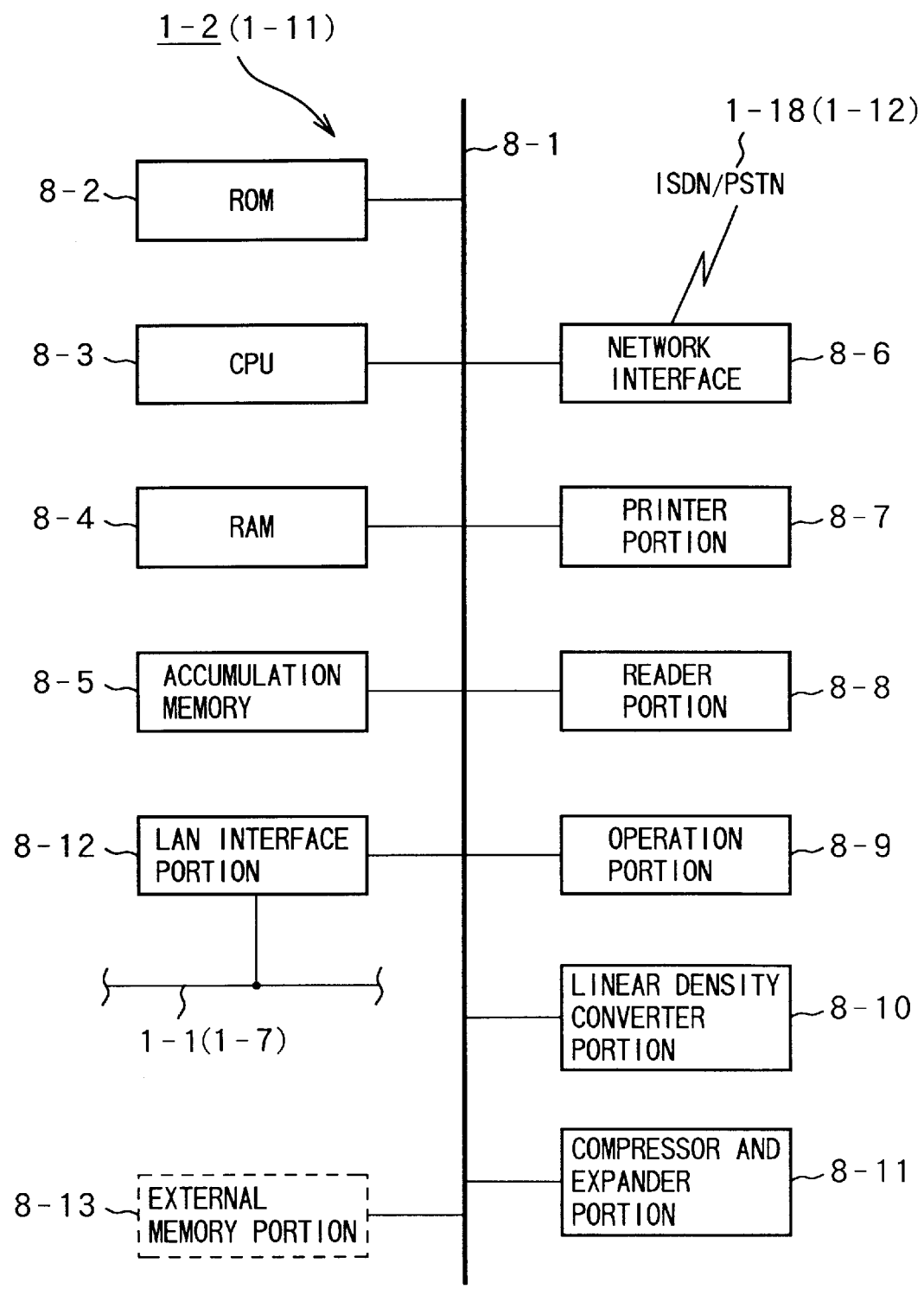
FIG. 8 is a block diagram of an electronic mail facsimile machine according to the embodiment of the present invention.

An example of the electronic mail facsimile machine 1-2 of Tokyo head office, which is a first relay station, is shown in FIG. 8.

In FIG. 8, each element is connected to the bus line 8-1. The read only memory (ROM) 8-2 stores a computer program (software for controlling the entire machine) performed by the central processing unit (CPU) 8-3. The CPU 8-3 controls the machine by performing the program, which is stored in the ROM 8-2, or is downloaded to the random access memory (RAM) 8-4.

The RAM 8-4 stores various kinds of data necessary for control, the registration control data shown in FIGS. 5A and 5B and the program. The accumulation memory 8-5 stores coded data of the facsimile communication, electronic mail data, scanning or printing image data. The accumulation memory 8-5 can be included in the RAM 8-4. The various kinds of data necessary for control, the registration control data and the program can be loaded from an external memory portion 8-13 mentioned below.

A network interface portion 8-6 includes a communication control unit (CCU) for performing communication via the ISDN network or the PSTN network 1-18, a modem, a network control unit (NCU) and others. The network interface portion 8-6 performs calling operation and communication operation to the network in accordance with the control by the CPU 8-3.

A printer portion 8-7 performs printing of facsimile received images, copy printing and other operations responding to a print request from the PC in accordance with the control by the CPU 8-3. A reader portion 8-8 performs scanning of a transmission image, copy scanning and other operations responding to a scan request from the PC in accordance with the control by the CPU 8-3. A operation portion 8-9 transmit key input information, various display information and other information to the control portion in accordance with the control by the CPU 8-3 so as to display depending on the operation.

An image linear density converter portion 8-10 performs conversion of image data resolution, conversion of page size and conversion of millimeters/inches. A compressor and expander portion 8-11 performs compression encoding such as MH, MR, MMR or JBIG of the image scanned by the reader portion 8-8 and performs expansion decoding of the received encoded data. A LAN interface portion 8-12 is an interface for connecting to the LAN 1-1.

The external memory portion 8-13 comprises a storage medium such as a flexible disk or a CD-ROM. The external memory portion 8-13 is used for storing the program and the registration control data shown in FIGS. 5A and 5B, which are loaded to RAM 8-4, the encoded data, electronic mail data, scanning or printing image data.

A bit map data for converting character codes into bit map image data when converting a text of an electronic mail data into image data is stored in the ROM 8-2.

Figure 10:
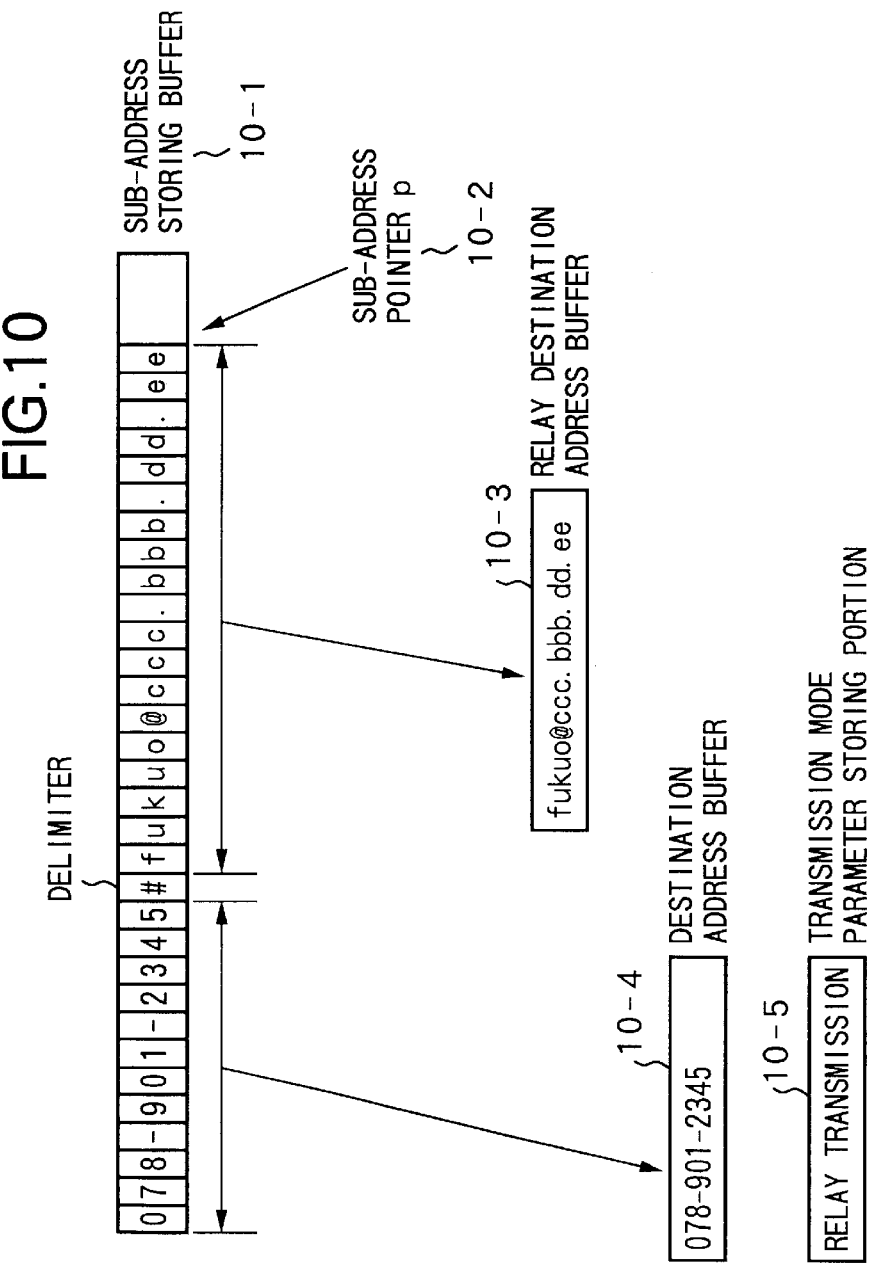
FIG. 10 shows an example of a sub-address control data of an electronic mail facsimile of a first relay station when performing relay instruction reception according to the embodiment of the present invention.

The first relay station has means for receiving and analyzing the sub-address shown in FIG. 10. First, the content of the received sub-address data is stored in the sub-address data buffer 10-1.

A buffer pointer 10-2 of the sub-address is incremented and is used for checking characters stored in the buffer. A relay destination address buffer 10-3 and a destination address buffer 10-4 are an area for storing the data of the sub-address storing buffer 10-1 after dividing the data by the delimiter "#".

The data before the delimiter "#", e.g., "078-9012-3456" is stored as a destination telephone address in the destination address buffer 10-4, while the data after the delimiter "#", e.g., "fukuo@ccc.dddd.ee" is stored as a relay destination mail address in the relay destination address buffer 10-3.

In a parameter holder portion 10-5 for storing a transmission mode, a transmission mode such as "electronic mail relay transmission" or "electronic mail transmission" is stored in accordance with a content of the above-mentioned sub-address storing buffer 10-1. The transmission mode is decided in accordance with existence of the delimiter and the content of the destination. If the delimiter exists in the content of the sub-address and the relay destination is an electronic mail address, the transmission mode is set to the "electronic mail relay transmission", while it is set to the "facsimile relay transmission" if the relay destination is a telephone number.

If the delimiter does not exist and the content of the data is an electronic mail address, the transmission mode is set to the "electronic mail", while it is set to the "facsimile transmission" if the content of the data is a telephone number.

Figure 9:
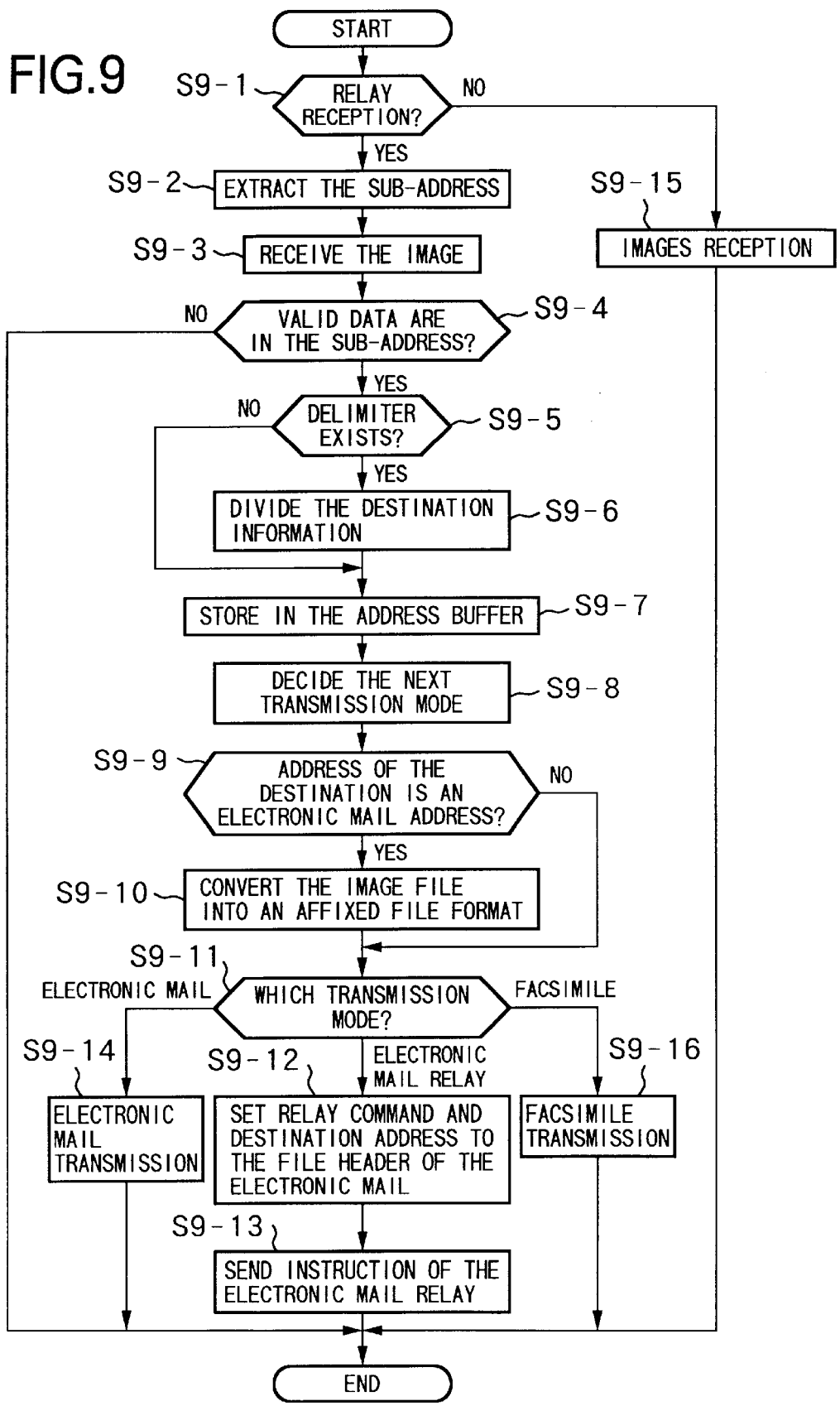
FIG. 9 is a flowchart of an operation of an electronic mail facsimile of a first relay station according to the embodiment of the present invention.

Example of Operation of the Electronic Mail Facsimile Machine in the First Relay Station FIG. 9 is a flowchart of a process in which the first relay station performs relay operation.

The first relay station recognizes a relay reception (S9-1), and write the sub-address into the sub-address storing buffer 10-1 (S9-2). If the reception is not a relay reception, the first relay station performs facsimile reception and print out the image (S9-15).

When receiving an image, the image data is converted into the accumulation form to store in the image memory, and the reception is finished (S9-3). After finishing the reception, the content of the sub-address storing buffer 10-1 is analyzed in accordance with the following procedure.

First, the content of the sub-address is checked to be valid data (S9-4). If it is constituted by valid data, existence of a delimiter that indicates assignment of a relay station is checked (S9-5).

If the delimiter exists, a mail address of the electronic mail facsimile that is the second relay station and a telephone number of the reception FAX are divided (S9-6), so that the destination address buffer 10-4 and the relay destination address buffer 10-3 store corresponding data (S9-7). Then, the next transmission mode is set to the "relay transmission" (S9-8). If the delimiter does not exists, the content of the sub-address storing buffer is duplicated to the destination address buffer 10-4 (S9-7), and the next transmission mode is set to the "electronic mail transmission" (S9-8).

If the content of the address buffer is a mail address (S9-9), the formerly received image file is converted into a file of TIFF form (S9-10). Then, the transmission operation starts in accordance with the next transmission mode (S9-11).

In this embodiment, the contents of the electronic mail are text files described by "Multipurpose Internet Mail Extensions" (MIME) that is an electronic mail data format recommended by IETF, and affixed image files converted into TIFF form.

As shown in FIGS. 11 and 12, assignment of the command portion in the MIME file depends on the transmission mode. In the normal transmission, the command portion includes "none" (See FIG. 11). If the transmission mode is the "relay transmission", the command portion of the MIME file is assigned to "relay", and the content of the destination address buffer 10-4 is set as the destination address (S9-12). Plural destination addresses can be set. An example is shown in FIG. 12. Then, the content of the relay destination address buffer 10-3 is set as the destination information (To:), which is sent to a storage device of the electronic mail server 1-10 in Fukuoka branch office via the remote router 1-4, the private line 1-6 and the remote router 1-8 by "Simple Mail Transfer Protocol" (SMTP) recommended by IETF (S9-13).

If the transmission mode is "electronic mail", the command portion of the MIME file is set to "transmission", and the content of the destination address buffer 10-4 is set as the destination information, which is sent by SMTP (S9-14).

Example of Operation in the Second Relay Station of Electronic Mail Facsimile Machine The electronic mail facsimile 1-11 of Fukuoka branch office that is the second relay station is constituted in the same manner as the first relay station, as shown in FIG. 8.

Figure 13:
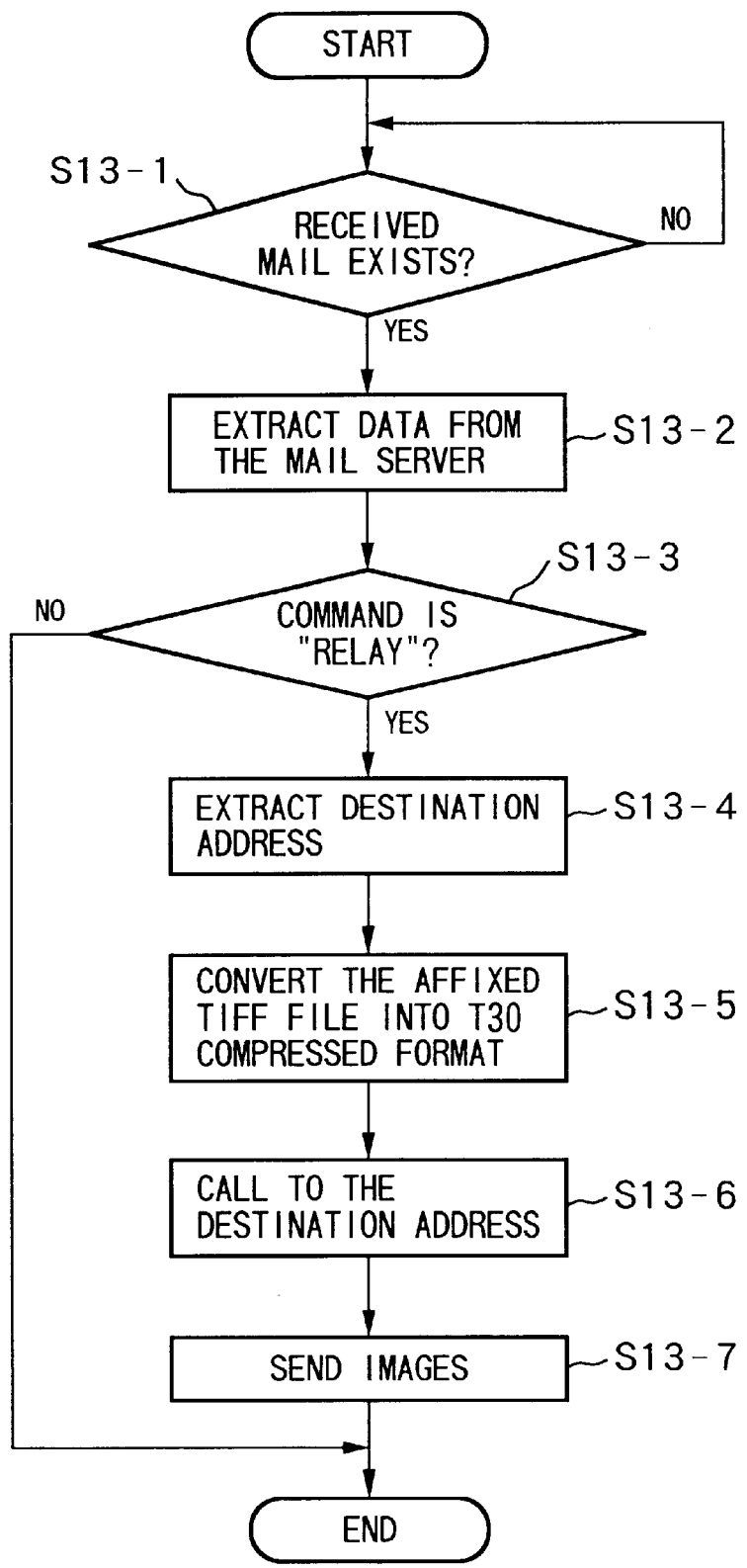
FIG. 13 is a flowchart of an operation of an electronic mail facsimile of a second relay station according to the embodiment of the present invention.

FIG. 13 is a flowchart of an operation in which the second relay station performs the relay transmission operation so as to perform transmission to the G3 facsimile via the PSTN.

The second relay station regularly polls the electronic mail server 1-10 in order to check and extract electronic mail data.

The polling process is performed by "Post Office Protocol Ver. 3" (POP3) recommended by the Internet Engineering Task Force (IETF).

If a received mail exists (S13-1), the electronic mail facsimile 1-11 extracts the electronic mail data form the electronic mail server 1-10 (S13-2).

Then, the electronic mail facsimile 1-11 recognizes the relay mode in accordance with the content of the extracted MIME format data (S13-3) and extracts the destination dial information (S13-4). It converts the affixed file into T.30 compressed form image data such as MMR (S13-5), automatically dials the other party (S13-6), and sends images (S13-7).

If plural destinations are set for the facsimile, they are communicated by broadcast. This facsimile transmission is performed by T.30 protocol of the ITU-T recommendation, for example.

The present invention can be applied to either a system including plural devices (e.g., a host computer, interface devices, readers and printers) or an apparatus including only one device (e.g., a copying machine or a facsimile machine).

The object of the present invention can be achieved also by installing a storage medium memorizing program codes of the software for realizing the function mentioned above into the system or the apparatus, so that a computer (CPU or MPU) of the system or the apparatus can read the program codes out of the storage medium and perform the program codes. In this case, the program code itself that is read out of the storage medium performs the function of the embodiment explained above, and the storage medium is to constitute the present invention.

The storage medium for supplying the program codes may includes a flexible disk, a hard disk, an optical disk, a CD-ROM, a CD-R, a magnetic tape, a non-volatile memory card, and a ROM, for example.

The function of the embodiment mentioned above can be realized not only by the program code that is read out by the computer, but also by an operating system (OS) working on the computer. In this case, the OS may perform a part of the process or the entire process in accordance with the instruction of the program code so as to perform the above-mentioned function.

The function of the embodiment mentioned above can be realized by the following configuration, too. The program codes that is read out of the storage medium may be loaded into a memory of an extension board installed in the computer or of an extension unit connected to the computer. Then, the CPU of the extension board or the extension unit performs a part or all of the process in accordance with the program codes, so as to perform the above-mentioned function.

When the present invention is applied to the above-mentioned storage medium, the program codes corresponding to the flowcharts explained above are to be stored in the storage medium.

According to the present embodiment, when facsimile machines of the transmission side and the reception side are connected to the public telephone line such as the ISDN or the PSTN, cost for the communication can be reduced by utilizing a network such as the Internet that is different from the public line.

When sending an image data from the source facsimile machine to the first relay machine connected to the Internet, sending the image data from the first relay machine to the second relay machine connected to the Internet, and sending the image data from the second relay machine to the reception facsimile machine connected to the Internet, destinations of the first relay machine, the second relay machine and the reception facsimile machine can be assigned by the source facsimile machine. Since each of the destinations can be designated in the source facsimile machine, the first relay machine does not need a complicated process for deciding the second relay machine, so that the communication cost can be reduced easily.

Furthermore, since the destinations of the second relay machine and the reception facsimile machine are sent by the facsimile transmission, the operator is not required to do bothersome instruction of destinations. Thus, easy operation can be obtained.

In addition, since the destinations of the second relay machine and the reception facsimile machine are assigned in accordance with T30 protocol recommended ITU-T, it is not necessary to design a non-standard protocol for assigning the destinations. Further, since the protocol is not special one, the communication can be performed widely with facsimile machines having the standard communication function.

According to the present embodiment, even if the destination is only one, the communication cost between the sending and the receiving facsimile machines can be reduced utilizing a network such as the Internet.

When sending an image data from the source facsimile machine to the first relay machine connected to the Internet via the public line, sending the image data to the second relay machine via the Internet, and sending the image data from the second relay machine to the reception facsimile machine connected to the public line, destinations of the first relay machine, the second relay machine and the reception facsimile machine can be assigned by easy operation in the source facsimile machine.

In addition, it is possible to communicate widely with facsimile machines having a standard communication function, without newly designing a non-standard protocol.

Next, another preferred embodiment of the present invention will be explained with reference to drawings.

Figure 14:
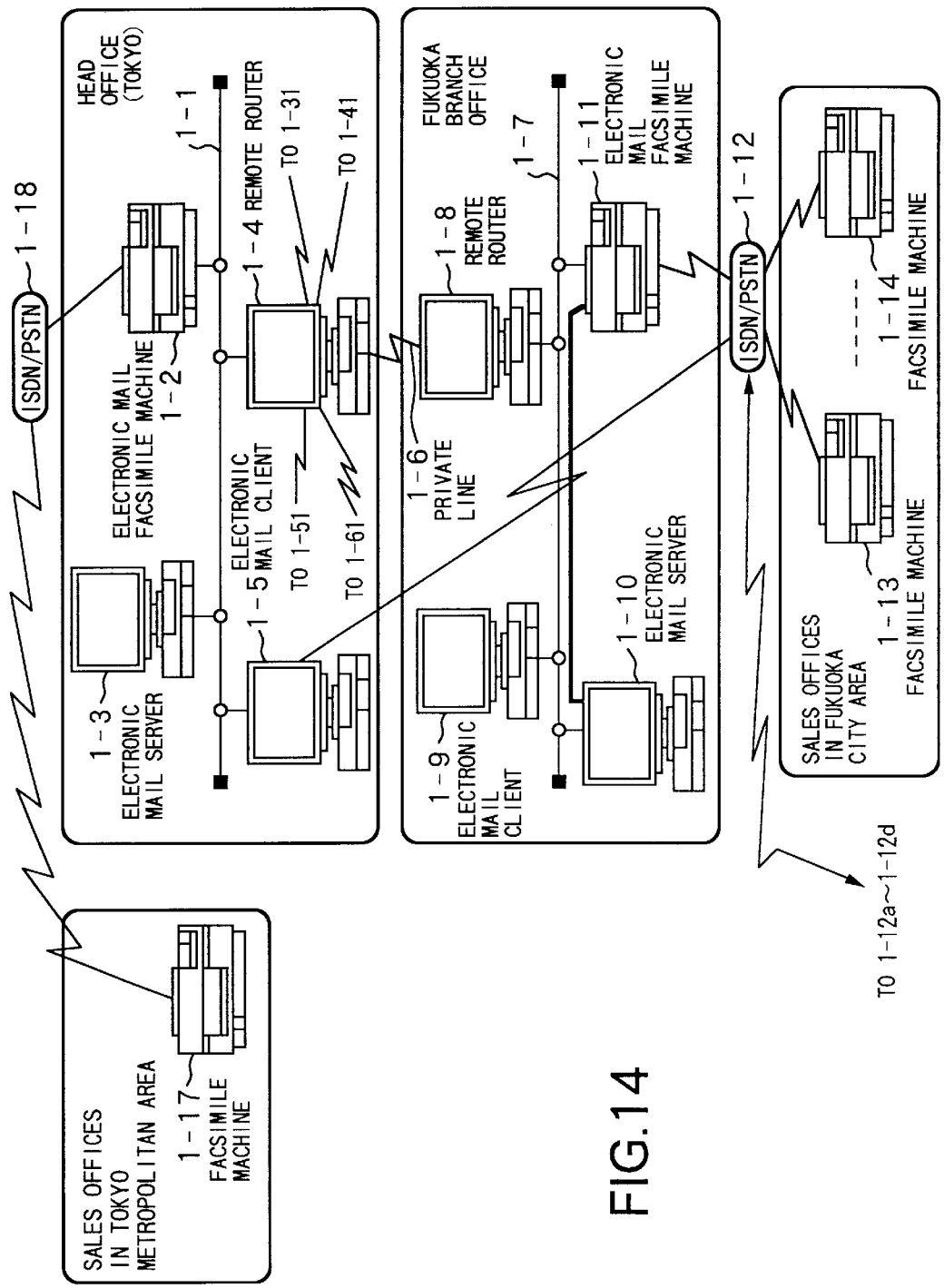
FIG. 14 shows a connection configuration of electronic mail facsimile machines with the network according to the embodiment of the present invention.
Figure 15:
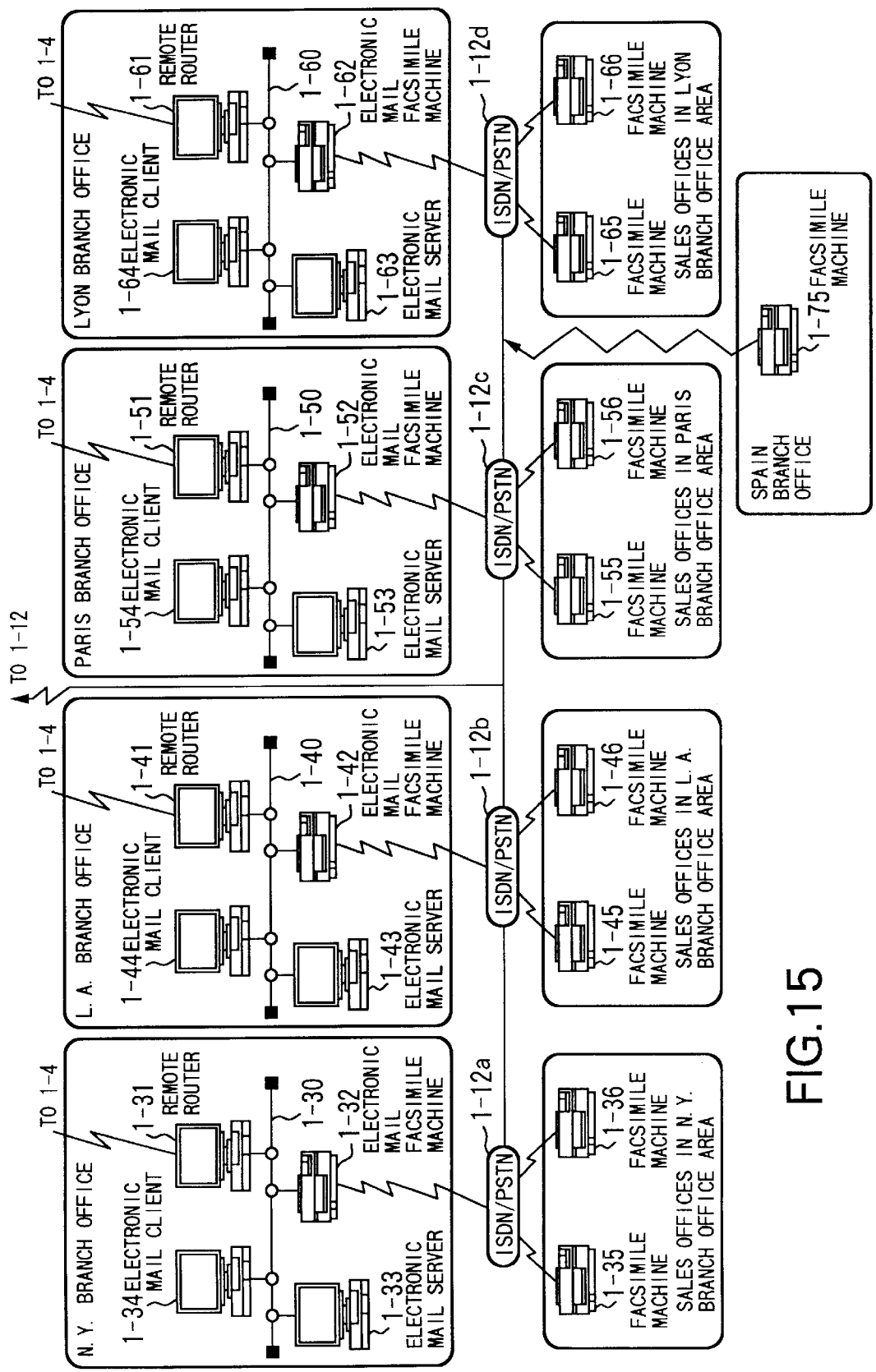
FIG. 15 shows a connection configuration of electronic mail facsimile machines with the network according to the embodiment of the present invention.

FIGS. 14 and 15 show a connection configuration of a network with a facsimile machine having a conversion function between an electronic mail and a facsimile (hereinafter, referred to an electronic mail facsimile machine) in accordance with the embodiment of the present invention.

In FIG. 14, the local area network (LAN) 1-1 of the head office (Tokyo) is connected with the electronic mail facsimile machine 1-2, the electronic mail server 1-3, the electronic mail client 1-5 and the remote router 1-4 for connecting with the LAN of Fukuoka branch office via the private line 1-6. In addition, the electronic mail facsimile machine 1-2 is connected to the Integrated Service Digital Network (ISDN) or the Public Service Telephone Network (PSTN) 1-18, so as to communicate with a facsimile machine 1-17 of a sales office in Tokyo metropolitan area.

On the other hand, the LAN 1-7 of Fukuoka branch office is connected to the remote router 1-8 for connecting with the LAN of the head office, the electronic mail facsimile machine 1-11, the electronic mail server 1-10 and electronic mail client 1-9. In addition, the electronic mail facsimile machine 1-11 is connected to the ISDN or the PSTN 1-12, so as to communicate with facsimile machines 1-13 and 1-14 of sales offices in Fukuoka branch office area.

In FIG. 15, the LAN 1-30 of N.Y. branch office in U.S.A. is connected to the remote router 1-31 for connecting with the LAN of the head office, the electronic mail facsimile machine 1-32, the electronic mail server 1-33 and electronic mail client 1-34. In addition, the electronic mail facsimile machine 1-32 is connected to the ISDN or the PSTN 1-12$a$, so as to communicate with facsimile machines 1-35 and 1-36 of sales offices in N.Y. branch office area.

The LAN 1-40 of L.A. branch office in U.S.A. is connected to the remote router 1-41 for connecting with the LAN of the head office, the electronic mail facsimile machine 1-42, the electronic mail server 1-43 and electronic mail client 1-44. In addition, the electronic mail facsimile machine 1-42 is connected to the ISDN or the PSTN 1-12$b$, so as to communicate with facsimile machines 1-45 and 1-46 of sales offices in N.Y. branch office area.

The LAN 1-50 of Paris branch office in France is connected to the remote router 1-51 for connecting with the LAN of the head office, the electronic mail facsimile machine 1-52, the electronic mail server 1-53 and electronic mail client 1-54. In addition, the electronic mail facsimile machine 1-52 is connected to the ISDN or the PSTN 1-12$c$, so as to communicate with facsimile machines 1-55 and 1-56 of sales offices in N.Y. branch office area.

The LAN 1-60 of Lyon branch office in France is connected to the remote router 1-61 for connecting with the LAN of the head office, the electronic mail facsimile machine 1-62, the electronic mail server 1-63 and electronic mail client 1-64. In addition, the electronic mail facsimile machine 1-62 is connected to the ISDN or the PSTN 1-12$d$, so as to communicate with facsimile machines 1-65 and 1-66 of sales offices in N.Y. branch office area.

This embodiment shows a case in which a facsimile is sent from the facsimile machine 1-17 of the sales office in Tokyo metropolitan area to the facsimile machine 1-55 of the sales office in Paris branch office area via the facsimile machine 1-2 of the head office and the facsimile machine 1-52 of the Paris branch office.

First, a configuration of the facsimile machine 1-17 of the sales office in Tokyo metropolitan area, which is a relay station, will be explained with reference to FIG. 3.

Figure 16:
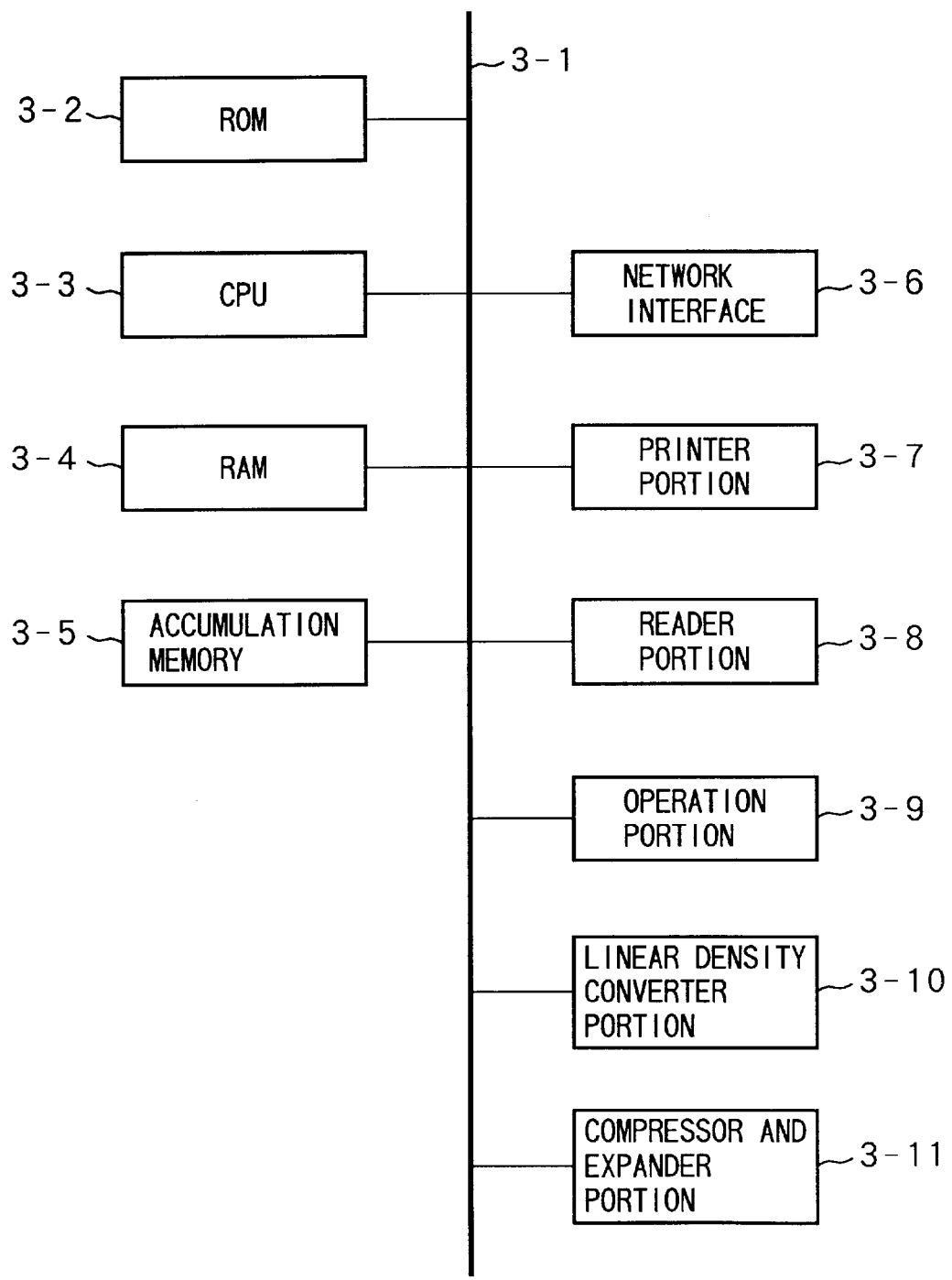
FIG. 16 is a block diagram of a facsimile machine according to the embodiment of the present invention.

FIG. 16 is a block diagram of the facsimile machine in accordance with the embodiment of the present invention. The facsimile machine 1-17 is a G3 standard though it can be G4 standard.

In FIG. 16, the read only memory (ROM) 3-2 stores a computer program (software for controlling the entire machine) performed by the central processing unit (CPU) 3-3. The CPU 3-3 controls the machine by performing the program stored in the ROM 3-2.

The RAM 3-4 stores various kinds of data necessary for control and the registration control data shown in FIG. 18. The accumulation memory 3-5 stores coded data for the facsimile communication, electronic mail data, scanning or printing image data.

A network interface 3-6 includes a communication control unit (CCU) for performing communication via the ISDN network or the PSTN network, a modem, a network control unit (NCU) and others. The network interface portion 3-6 performs calling operation and communication operation to the network in accordance with the control by the CPU 3-3. A printer portion 3-7 prints received images, performs copy printing and other operations responding to a print request from the PC in accordance with the control by the CPU 3-3. A reader portion 3-8 performs scanning of image to be sent, copy scanning and other operations responding to a scan request from the PC in accordance with the control by the CPU 3-3.

An operation portion 3-9 includes keys for inputting a telephone number or an electronic mail address of the destination, instructing transmission and other operations. The operation portion 3-9 also has a display portion that displays responding to the key input information according to the control of the CPU 3-3. In addition, the operation portion 3-9 has a relay button for instructing the electronic mail relay transmission as explained below. A linear density converter portion 3-10 performs conversion of image data resolution, conversion of image data size and scale conversion of millimeters/inches. A compressor and expander portion 3-11 performs compression encoding such as MH, MR, or MMR of the image scanned by the reader portion 3-8 and performs expansion decoding of the encoded data that was received.

The elements of the facsimile machine mentioned above are connected to each other via the bus line 3-1.

Next, the above-mentioned registration control table is explained with reference to FIG. 18.

FIG. 18 shows an example of the registration control table in accordance with the embodiment of the present invention.

The registration control table is used for registering data for controlling communication between electronic mail facsimile machines of the present invention, and is maintained in each facsimile machine. An example of data registered in the registration control table for the case is illustrated, in which the relay instruction station, i.e., facsimile machine 1-17 send a facsimile to the facsimile machine 1-55 of the sales office in Paris branch office area (e.g., Montmartre office) via the first relay station, i.e., the electronic mail facsimile machine 1-2 and the second relay station, i.e., the electronic mail facsimile machine 1-52.

The data that are controlled by the registration control table 5-1 shown in FIG. 18 are used when the destination input is the one-touch dialing or the abbreviated dialing. The data includes destination abbreviated name data 5-2 indicating the abbreviated name of the destination, destination data 5-3 indicating a telephone number or an electronic mail address of the destination, transmission mode data 5-4 indicating the kind of the transmission method (electronic mail relay transmission mode or facsimile transmission mode), and first relay station data 5-5 indicating a telephone number of the first relay station when the transmission mode is the electronic mail relay transmission mode.

The electronic mail relay transmission mode means a mode in which the first relay station sends data to the destination in the electronic mail data format. The facsimile transmission mode means a mode in which the first relay station sends data to the destination in the facsimile data format.

The first relay station receives a facsimile via the ISDN or the PSTN, and sends an electronic mail via a private line or the Internet in such a way that the electronic mail facsimile machine 1-18 of the head office destination performs. The second relay station receives an electronic mail via a private line or the Internet, and sends a facsimile via the ISDN or the PSTN in such a way that the electronic mail facsimile machine 1-52 of the Paris branch office performs. Each of the first and the second relay stations must be an electronic mail facsimile machine.

The first relay station assigns the first relay station data 5-5, decides the second relay station according to the destination data 5-3, converts the facsimile data into the file format that can be sent by electronic mail, and sends the data. The telephone number indicated by the first relay station data 5-5 is used as a destination.

In the present invention, communication between the electronic mail facsimile machines mentioned below is performed utilizing a sub-address defined by the ITU-T T30. A work area for deciding the content of the sub-address (hereinafter, referred to sub-address data) and data that is stored in the storing buffer storing buffer are explained with reference to FIG. 19.

Figure 19:
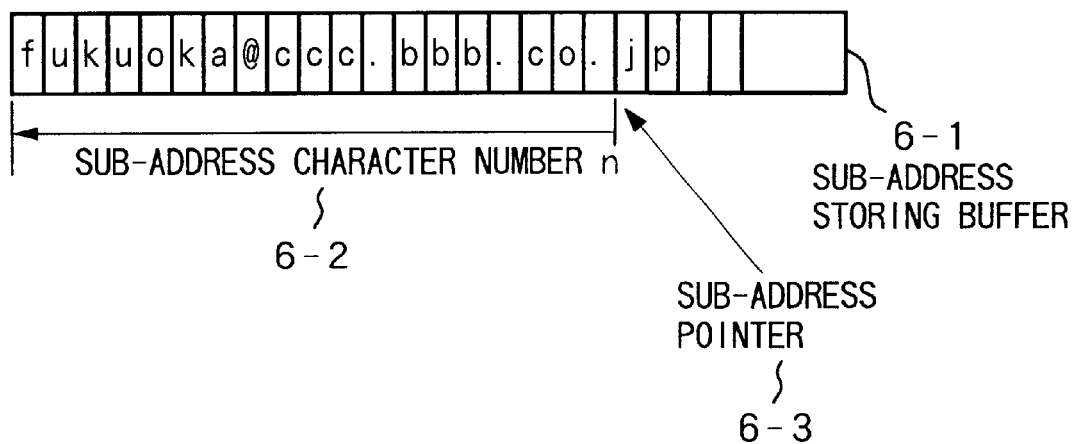
FIG. 19 shows a structure of a sub-address storing buffer according to the embodiment of the present invention.

FIG. 19 shows a sub-address storing buffer in accordance with the embodiment of the present invention. The sub-address storing buffer is provided in the RAM 3-4, for example. When the destination is indicated by a telephone number, the telephone number is stored as the sub-address data in the sub-address storing buffer. If the destination is indicated by an electronic mail address, the electronic mail address is stored as the sub-address data. This corresponds to the destination data 5-3 shown in FIG. 18.

In FIG. 19, the sub-address storing buffer 6-1 comprises character number data 6-2 indicating the number n of characters included in the sub-address data, and a storing address pointer 6-3 indicating the end of the character for counting the number of characters.

Figure 20A:
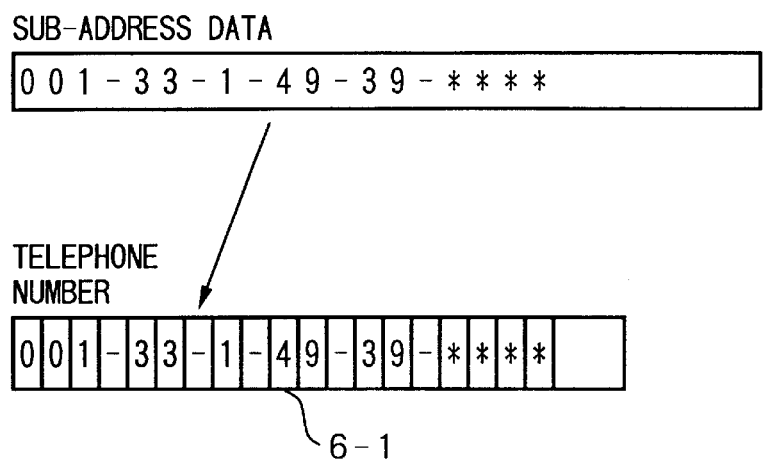
FIGS. 20A and 20B show an example of the sub-address data stored in the sub-address storing buffer according to the embodiment of the present invention.
Figure 20B:
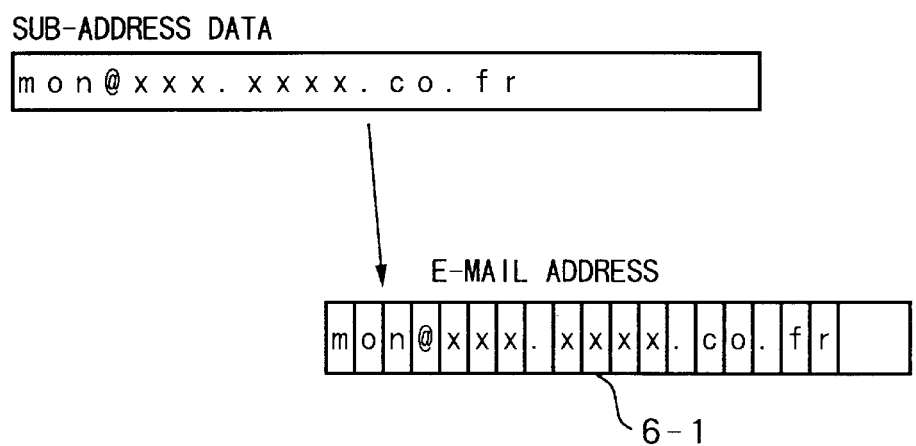

In this embodiment, since the destination is a facsimile machine 1-55, sub-address data including a telephone number as shown in FIG. 20A are stored in the sub-address storing buffer 6-1. If the electronic mail address is sub-address data, the electronic mail address is stored in the sub-address storing buffer 6-1 as shown in FIG. 20B.

Next, the operation of the relay instruction station, i.e., the facsimile machine 1-17 instructing the electronic mail relay transmission mode and sending via the electronic mail facsimile machine 1-2, will be explained with reference to FIGS. 17A and 17B.

Figure 17A:
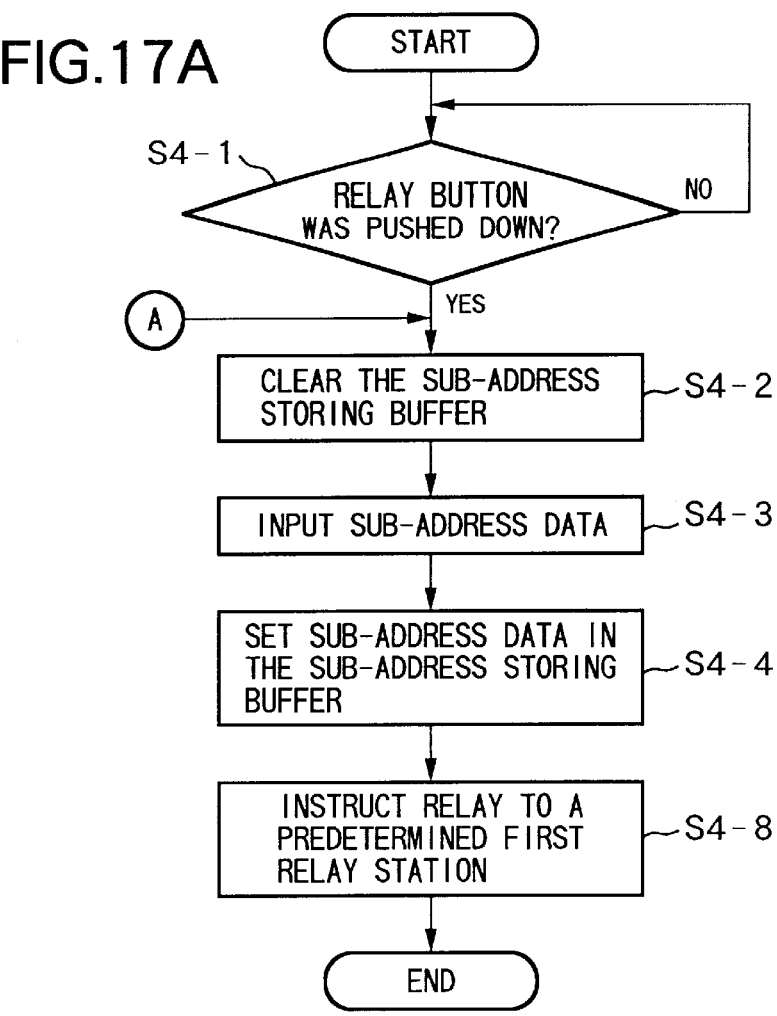
FIGS. 17A and 17B are flowcharts of an operation in which the relay instruction station instructs the relay transmission for performing transmission via the electronic mail facsimile machine.
Figure 17B:
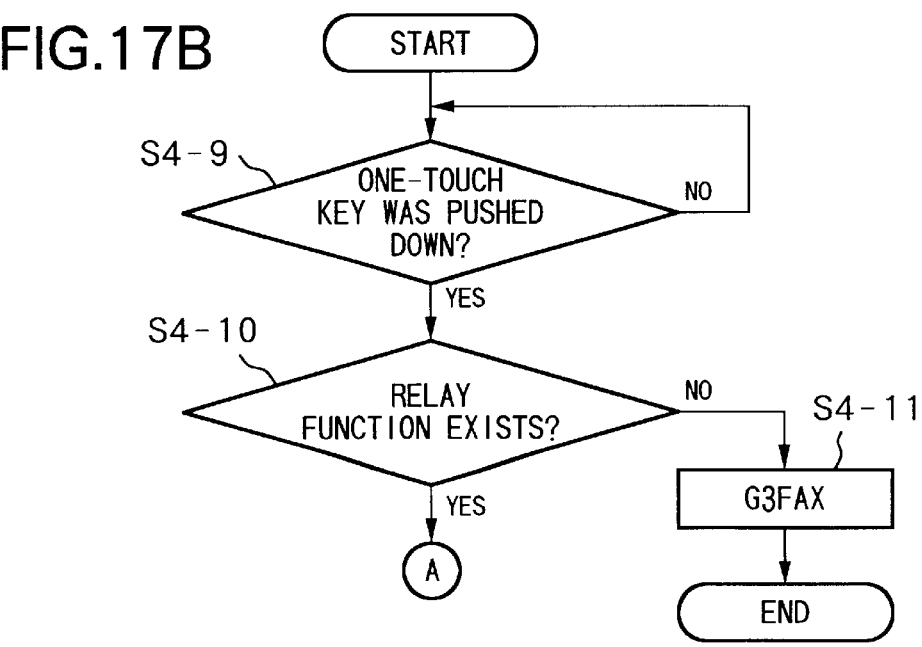

FIGS. 17A and 17B are flowcharts of the operation of the relay instruction station instructing the relay transmission and sending via the electronic mail facsimile machine.

First, FIG. 17A shows an operation in which transmission to the first relay station using the relay button of the operation portion 3-9 will be explained.

By a key operation of the operation portion 3-9 in the relay instruction station (the facsimile machine 17-1) it is judged if the relay button instructing the electronic mail relay transmission was pushed down or not (step S4-1). If the relay button was not pushed down ("NO" in step S4-1), pushing down is waited. If the relay button was pushed down ("YES" in step S4-1), electronic mail relay transmission mode starts and the process goes to step S4-2.

At the beginning of the electronic mail relay transmission mode, the content of the sub-address storing buffer 6-1 is cleared with NULL, so that the character number data and the control data of the storing address pointer are initialized (step S4-2). Then, the sub-address data for the destination is inputted (step S4-3). The sub-address data are a telephone number or an electronic mail address of the destination as mentioned above. The input of the sub-address data is performed by using ten key of the operation portion 3-9, the one-touch dialing or the abbreviated dialing. The content of the destination may be either a telephone number or an electronic mail address.

Next, the inputted sub-address data is written into the sub-address storing buffer 6-1 (step S4-4). Then calling to the first relay station (electronic mail facsimile machine 1-2) is performed, an original image to be sent is read, and the relay transmission is instructed (step S4-8).

An operation of the case, in which the second relay station is assigned while the sub-address data of the destination and the transmission mode are registered corresponding to the one-touch key of the operation portion 3-9, will be explained with reference to FIG. 17B.

In the stand-by state it is judged if the one-touch key of the operation portion 3-9 was pushed down or not (step S4-9). If the one-touch key was not pushed down ("NO" in step S4-9), pushing down of the one-touch key is waited. If the one-touch key was pushed down ("YES" in step S4-9), the content of the registration for the one-touch key is referred so as to judge whether the electronic mail relay transmission mode is set or not (step S4-10). If the electronic mail relay transmission mode is not set ("NO" in step S4-10), the process goes to step S4-11 so as to perform normal G3 transmission. If the electronic mail relay transmission mode is set ("YES" in step S4-10), the process goes to step S4-2 of FIG. 17A so as to perform the above-mentioned operation.

Next, a configuration of the electronic mail facsimile machine 1-2 that is a first relay station of the embodiment will be explained with reference to FIG. 21.

Figure 21:
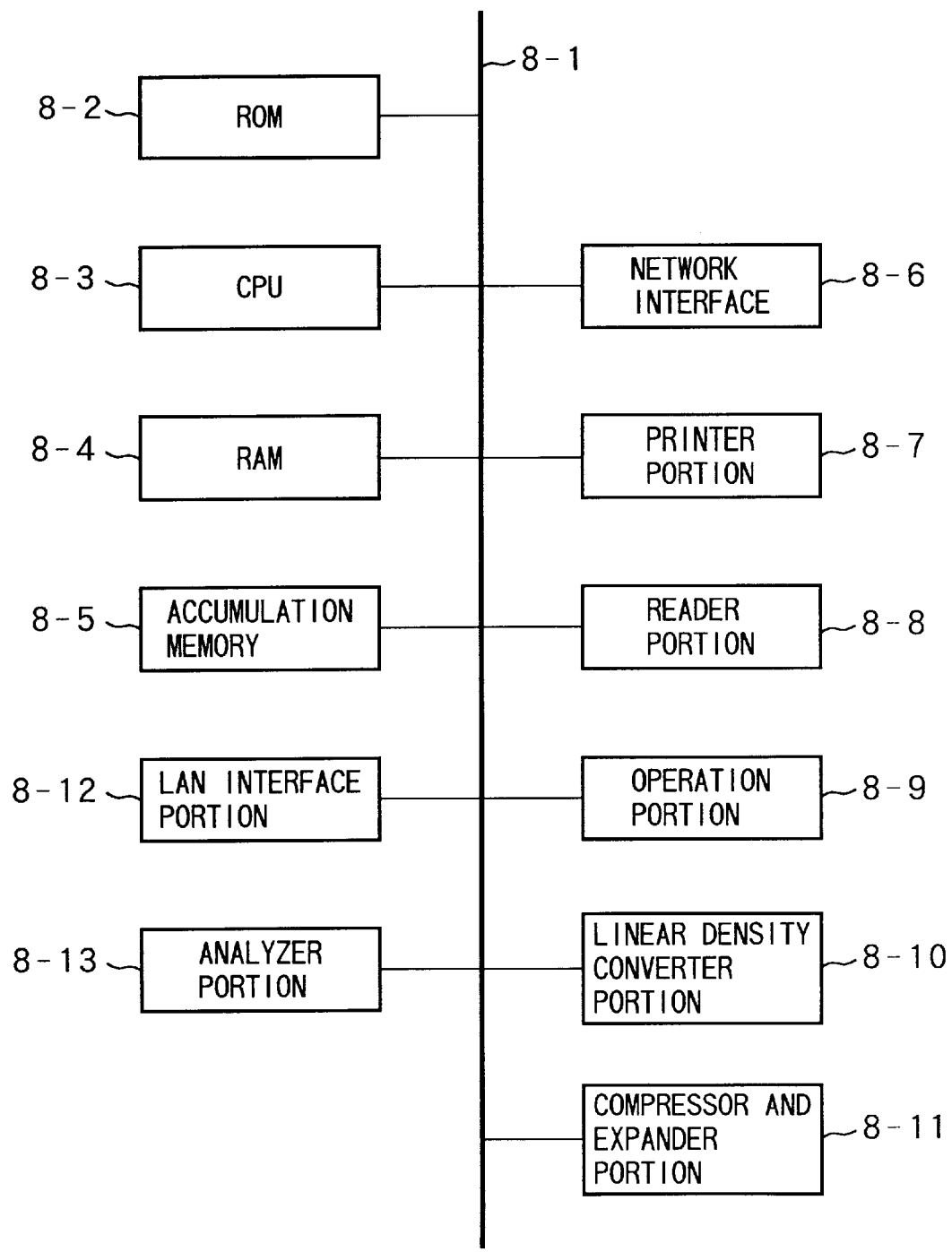
FIG. 21 is a block diagram of an electronic mail facsimile machine according to the embodiment of the present invention.

FIG. 21 is a block diagram of the electronic mail facsimile machine in accordance with the embodiment of the present invention.

In FIG. 21, the read only memory (ROM) 8-2 stores a computer program (software for controlling the entire machine) performed by the central processing unit (CPU) 8-3. The CPU 8-3 controls the machine by performing the program stored in the ROM 8-2.

The RAM 8-4 stores various kinds of data necessary for control and the tables shown in FIGS. 26, 27 and 28. The accumulation memory 8-5 stores coded facsimile data of the facsimile communication, electronic mail data, scanning or printing image data.

A network interface portion 8-6 includes a communication control unit (CCU) for performing communication via the ISDN network or the PSTN network 1-18, a modem, a network control unit (NCU) and others. The network interface portion 8-6 performs calling operation and communication operation to the network in accordance with the control by the CPU 8-3. A printer portion 8-7 performs printing of facsimile received images, copy printing and other operations responding to a print request from the PC in accordance with the control by the CPU 8-3. A reader portion 8-8 performs scanning of a transmission image, copy scanning and other operations responding to a scan request from the PC in accordance with the control by the CPU 8-3.

A operation portion 8-9 transmit key input information, various display information and other information to the control portion in accordance with the control by the CPU 8-3 so as to display depending on the operation. An linear density converter portion 8-10 performs conversion of image data resolution, conversion of page size, conversion of millimeters/inches and other conversion. A compressor and expander portion 8-11 performs compression encoding such as MH, MR or MMR of the image scanned by the reader portion 8-8, and performs expansion decoding of the received encoded data. A LAN interface portion 8-12 is an interface for connecting to the LAN. A bit map data for converting character codes into bit map image data when converting a text of an electronic mail data into image data is stored in the ROM 8-2.

An analyzer portion 8-13 receives and analyzes the sub-address data and the transmission mode stored in the sub-address storing buffer 6-1 of the above-mentioned facsimile machine. The analyzing procedure will be explained with reference to FIG. 10. The analyzer portion 8-13 includes a sub-address storing buffer 10-1 having the same function as the sub-address storing buffer. The received sub-address data is stored in the sub-address storing buffer 10-1. A sub-address pointer 10-2 is incremented every time when a character is stored in the sub-address storing buffer 10-1, so as to indicate the end of the stored characters. Then, the stored sub-address data is stored in a relay destination address buffer 10-4 as a relay destination address. One of the transmission modes including the "electronic mail relay transmission" and the "facsimile transmission" is stored in the transmission mode storing parameter buffer 10-5 in accordance with the content of the sub-address data. Thus, if the content of the sub-address data is an electronic mail address, the transmission mode is set to the "electronic mail relay transmission", while if it is a telephone number, the transmission mode is set to the "facsimile transmission".

The elements of the facsimile machine mentioned above are connected to each other via the bus line 8-1.

The electronic mail facsimile machine 1-52 of Paris branch office that is the second relay station has the same configuration as the first relay station mentioned above and shown in FIG. 8.

Next, the operation of the first relay station will be explained with reference to FIG. 22.

Figure 22:
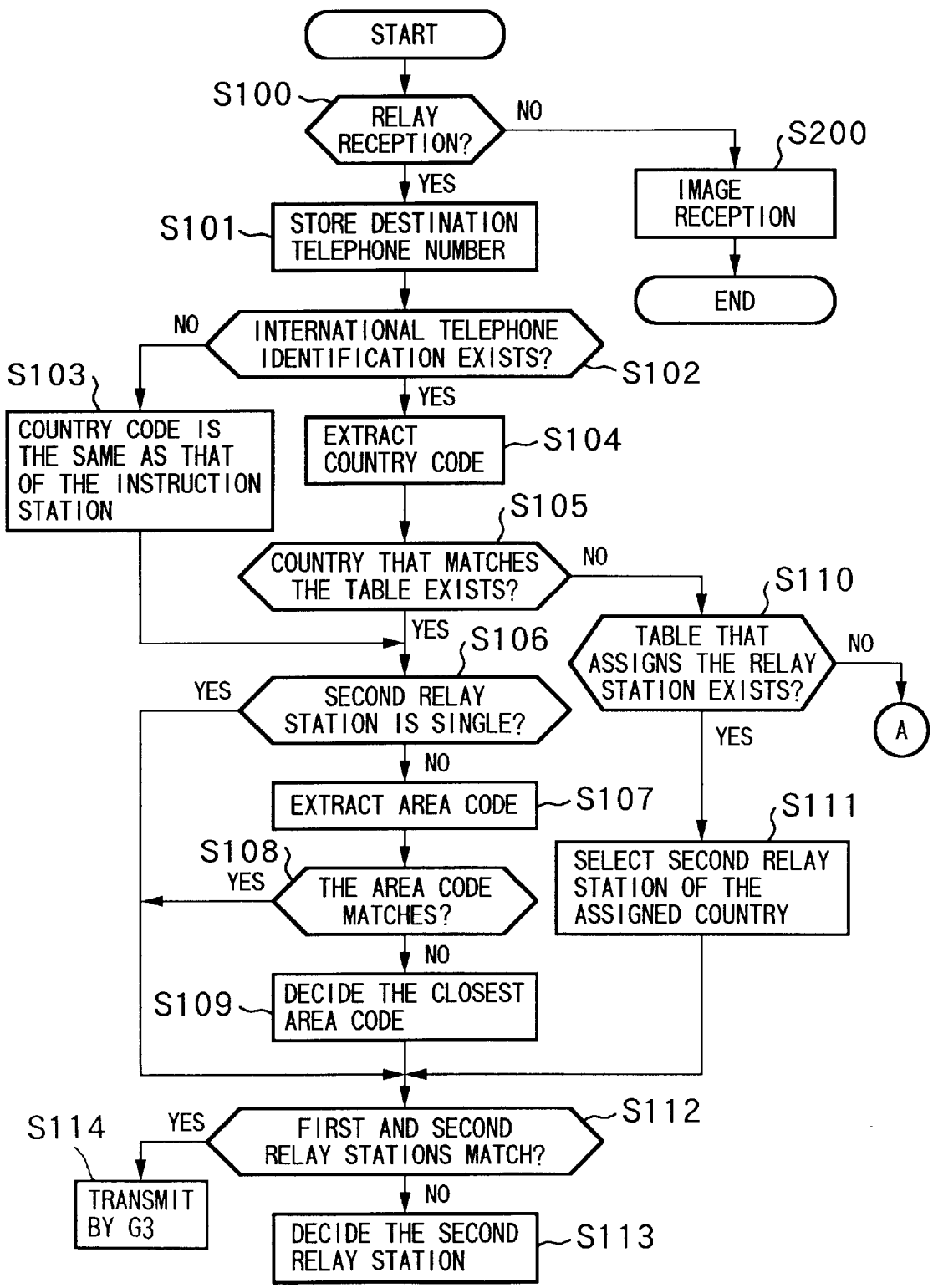
FIG. 22 is a flowchart of an operation performed by the first relay station according to the embodiment of the present invention.
Figure 23:
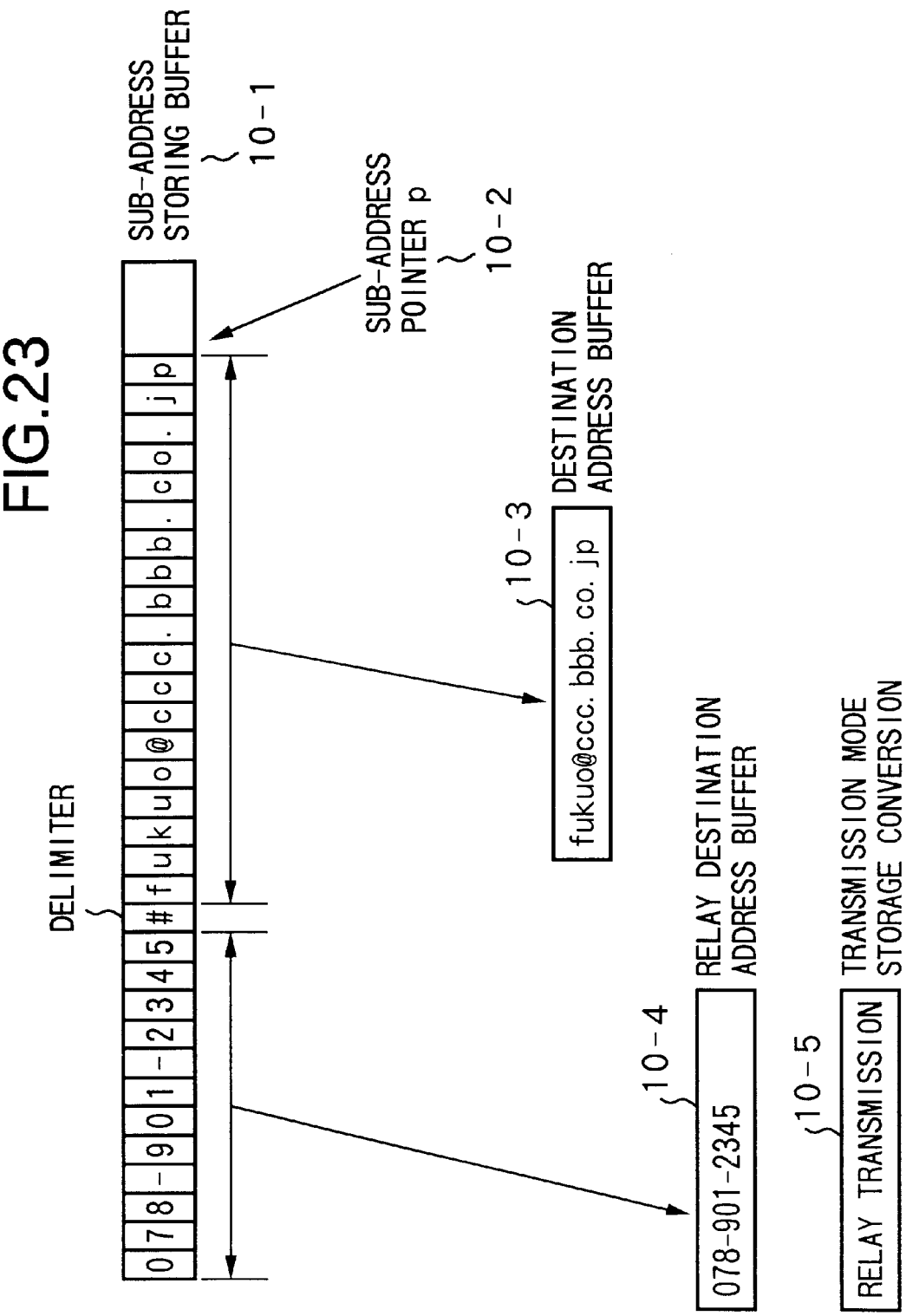
FIG. 23 is an explanatory diagram of an analysis procedure of sub-address data performed by the first relay station according to the embodiment of the present invention.

FIG. 22 is a flowchart of the operation performed by the first relay station in accordance with the embodiment of the present invention.

A sub-address data is received from the facsimile machine 1-17 that is a relay instruction station, so as to judge if the transmission mode is the relay transmission by the electronic mail relay transmission mode or not (step S100). If the transmission mode is not the relay transmission ("NO" in step S100), data are received by facsimile from the facsimile machine 1-17, and images corresponding to the received data are printed (step S200). On the other hand, the transmission mode is the relay transmission ("YES" in step S100), the process goes to step S101, in which a telephone number of an electronic mail address of the destination is stored in the RAM 8-4 in accordance with the received sub-address data.

Then, it is judged whether an international telephone identification exists or not corresponding to the telephone number or the electronic mail address of the destination stored in the RAM 8-4 referring to an international telephone number identification table shown in FIG. 27 (step S102). If the international telephone identification does not exist ("NO" in step S102), the process goes to step S103, in which the international telephone identification of the telephone number or the electronic mail address of the destination is judged to be the same as that of the relay instruction station. On the other hand, if the international telephone identification exists ("YES" in step S102), the process goes to step S104.

In the international identification telephone number table shown in FIG. 27, Japanese international telephone identifications "001" and "0041" and American international telephone identification "011" are registered as default. In addition, an international telephone identification of an international telephone company that a user made a contract (e.g., 0120--**) can be registered in the international telephone identification table at any time by using the operation portion 8-9.

If the international telephone identification exists corresponding to the telephone number or the electronic mail address of the destination, the country code is extracted (step S104). Then the extracted country code and the relay destination table shown in FIG. 26 are verified so as to judge whether a country code exists or not that matches the relay destination table (step S105).

A configuration of the relay destination table for the first relay station to decide transmission means and a relay path will be explained with reference to FIG. 26.

FIG. 26 shows an example of the relay destination table in accordance with the embodiment of the present invention.

As shown in FIG. 26, an international telephone number including a country code and an area code, and an electronic mail address of the relay station are registered in the relay destination table. In addition, a country code and an area code of the neighboring country being in charge of the relay also can be registered.

This relay destination table may have an additional function of rejecting a relay instruction by an electronic mail address that is not registered in the relay destination table or requesting a pass word for verifying so that the relay function cannot be used incorrectly by outsiders.

FIG. 22 will be explained again.

In the judgement of step S105, if the country code matching the relay destination table does not exists ("NO" in step S105), the process goes to step S110 so as to judge whether the country code being charge of the relay exists or not. If the country code being charge of the relay does not exist ("NO" in step S110), the process goes to step S114 so as to perform the normal G3 transmission to the destination indicated by the sub-address data. On the other hand, if the country code being charge of the relay exists ("YES" in step S110), the process goes to step S111, in which the electronic mail facsimile machine corresponding to the country code is selected as the second relay station.

In the judgement of step S105, if the country code matching to the relay destination table exists ("YES" in step S105), the process goes to step S106 so as to judge whether the potential second relay station is one or not, on the basis of the number of the matching country code. If the potential second relay station is one ("YES" in step S106), the potential station is selected as the second relay station and the process goes to step S112. If the potential second relay station is not one ("NO" in step S106), the process goes to step S107 in which a telephone number including an area code of each potential second relay station is extracted. Then it is judged whether the extracted telephone number including the area code and the telephone number decided on the basis of the received sub-address data are identical or not (step S108). If they are identical ("YES in step S108), the station having the telephone number is selected as the second relay station, and the process goes to step S112. On the other hand, if they are not identical ("NO" in step S108), the process goes to step S109, so as to decide a telephone number that is the closest to the telephone number decided by the received sub-address data (step S108).

From step S105 to step S111, a first relay station table that was registered previously as shown in FIG. 28 is referred, so as to judge whether the potential second relay station that was selected as only one and the first relay station are identical or not (step S112). If they are identical ("YES" in step S112), the process goes to step S114, in which a normal G3 transmission to the destination indicated by the sub-address data is performed. On the other hand, if they are not identical ("NO" in step S112), the process goes to step S113, in which the selected potential second relay station is decided as the second relay station, and an electronic mail including a telephone number or an electronic mail address of the destination indicated by the sub-address data in the procedure explained below.

A concrete example of the above-mentioned process will be explained with reference to FIG. 25.

If the facsimile number of the destination facsimile machine is "001-33-1-49-39-****" for example, the international telephone identification "001" is extracted in step S102, and the country code "33" is extracted in step S103, so as to select the potential second relay station that has electronic mail address including "fr" form the relay destination table.

If the facsimile number is "093-222-3333" for example, the transmission destination is judged to be in the same country as the relay instruction station since the number does not have the international telephone identification. In this case, it is judged to be in "Japan", and the second relay station having the electronic mail address including "jp" from the relay destination table. If the plural potential second relay stations exist, they are narrowed down to one by using the telephone number including the area code.

If the facsimile number such as "090-222-3333" that is not registered in the relay destination table, the potential second relay station having an electronic mail address including an area code closest to "090" is selected from the relay destination table.

Alternatively, the relay destination table may have a telephone number including an area code and a corresponding telephone number having an area code closest to the telephone number, and the potential second relay station may be selected from them. These two methods can be combined to select the potential second relay station.

If the facsimile machine 1-75 of Spain sales office, in which no electronic mail facsimile machine exists, is selected as the destination, the facsimile machine of the sales office in the neighboring Paris branch office area is selected, via which the transmission is performed. Thus, the data can be sent via the short distance international communication line.

Next, the operation after the second relay station is decided will be explained.

When the second relay station is decided by the operation mentioned above with reference to FIG. 22, the first relay station (electronic mail facsimile machine 1-2) converts image data received from the relay instruction station (facsimile machine 1-17) into TIFF image data. The transmission contents of the image data are text data written in Multipurpose Internet Mail Extensions (MIME) that is an electronic mail data format recommended by IETF, and affixed image data in the TIFF format.

The instruction of the command portion in the image data written in MIME is set to the "electronic mail relay transmission" and the content of the relay destination address buffer 10-4 is set as the relay destination address. An example of the command is shown in FIG. 24. Plural relay destination addresses can be set in such a way as facsimile machines 1-55 and 1-56 of the sales offices in Paris branch office area. If the image data to be sent are an electronic mail, the instruction of the command portion in the image data written in MIME is set to the "transmission".

The image data is sent to the electronic mail server 1-53 of Paris branch office via the remote router 1-4, the private line 1-6 and the remote router 1-8, by Simple Mail Transfer Protocol (SMTP) that is one of electronic mail transfer protocols recommended by IETF. If a private line, e.g., the private line 1-6 is not used, the Internet can be used to send to the electronic mail server 1-53 of Paris branch office.

Next, the operation performed in the second relay station will be explained with reference to FIG. 25.

Figure 25:
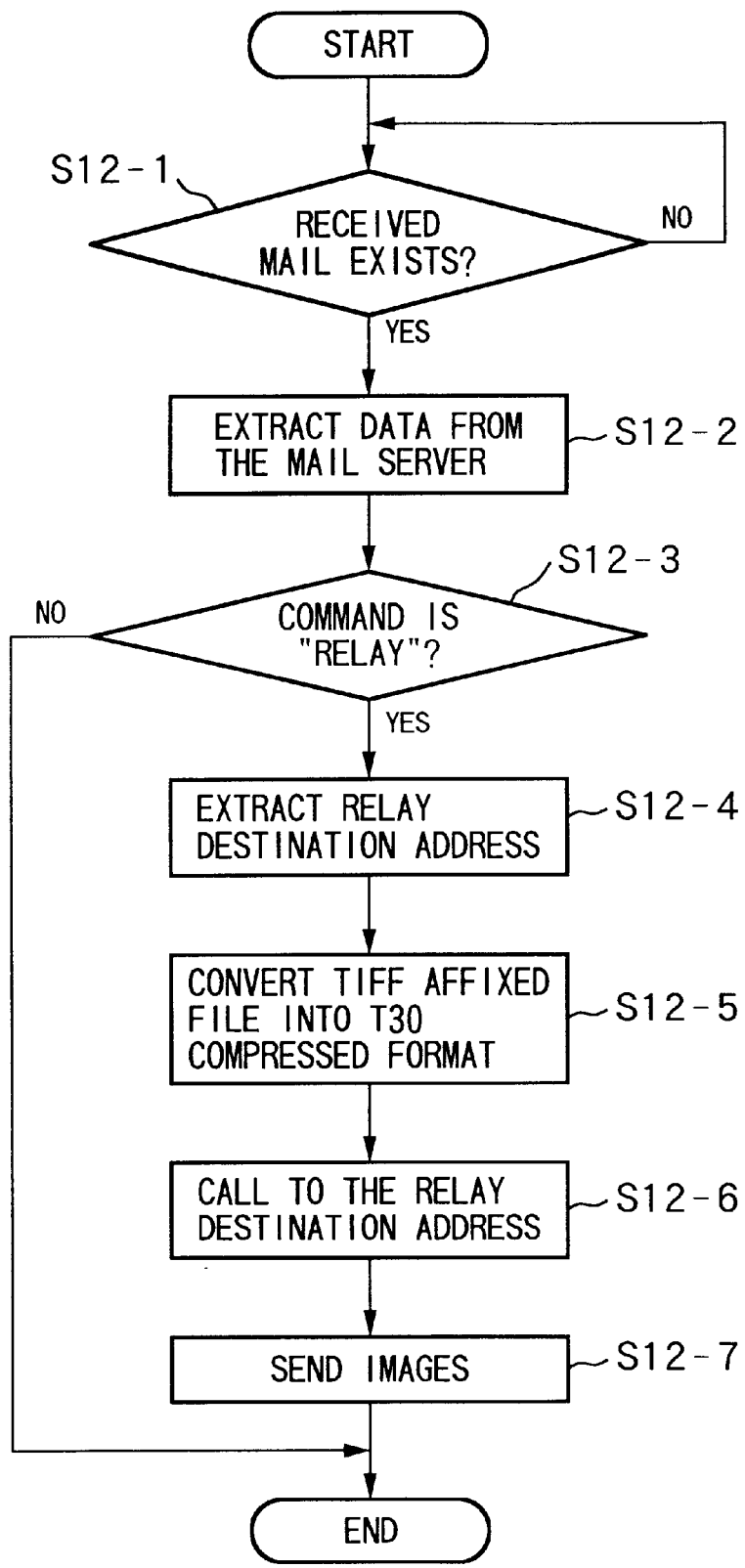
FIG. 25 is a flowchart of an operation performed by the second relay station according to the embodiment of the present invention.

FIG. 25 is a flowchart of the operation performed by the second relay station in accordance with the embodiment of the present invention.

The electronic mail facsimile machine 1-52 that is the second relay station of the embodiment regularly performs asking of existence of electronic mail data and extracting process of the electronic mail data by polling. The polling operation is performed by the Post Office Protocol Ver. 3 (POP3) that is one of the electronic mail transfer protocol recommended by IETF.

First, it is judged whether electronic mail data were received or not (step SC-1). If the electronic mail data were not received ("NO" in step S12-1), reception of electronic mail data is waited. On the other hand, if the electronic mail data were received ("YES" in step S12-1), the process goes to step S12-2. Then, the transmission mode is judged to be the electronic mail relay transmission mode or not on the basis of the extracted electronic mail (step S12-3). If it is not the electronic mail relay transmission mode ("NO" in step S12-3), the process is finished. On the other hand, if it is the electronic mail relay transmission mode ("YES" in step S12-3), the process goes to step S12-4.

Next, sub-address data to be a destination are extracted (step S12-4). Then, the image data of TIFF format affixed to the electronic mail data are converted into image data of T30 compressed format such as MMR (step S12-5). After calling to the destination indicated by the sub-address data (step S12-6), the image data including the compressed image data is sent by facsimile to the destination (step S12-7). If plural destinations are assigned, the image data are sent by broadcast. The facsimile transmission is performed in accordance with the T30 procedure recommended by ITU-T.

As explained above, according to this embodiment, any terminal connected to the public line such as the ISDN or the PSTN, or the Internet can be relayed with image data received by facsimile. In addition, also in the case of relay transmission, automatic transmission can be performed even if the operator does not recognize the difference between networks to be connected. Furthermore, new procedure is not necessary since the network is recognized in accordance with the destination.

If the destination is judged to be an electronic mail address, the image data are converted into the file format that can be sent by electronic mail, so that a facsimile image can be sent also to the destination having an electronic mail address on the Internet.

The relay function for transferring image data that was received by facsimile can be available to any terminal connected to the public line such as the ISDN or the PSTN, or the Internet. The operator of the relay station is not required to recognize that the destination is connected to which one of the public line and the Internet for transferring the image data received by facsimile to the destination.

Since the communication is performed between the transmission side terminal and the reception side terminal connected to the public line utilizing a network such as the Internet that is different from the public line, the communication fee can be reduced.

When receiving image data from the source facsimile machine, and relaying the received image data to the relay station, it is judged whether the second relay station is included or not on the basis of the sub-address data, so that the image data can be sent to the second relay station. Furthermore, a simple relay system can be provided, in which the first relay station is not required to have complicated information for controlling the relaying path.

By judging whether the sub-address data include the second relay station or not, the operator of the first relay station is not bothered for instructing the transmission in the electronic mail relay transmission mode to the second relay station, even if the networks are different. In addition, since the network to be connected is recognized on the basis of the sub-address data, the destination of the second relay station sent by the new source station for distinguish the network and the destination of the reception side facsimile machine can be received by the procedure of the facsimile machine. Therefore, the operator of the first relay station is not required to do complicated operations such as reception of the destination or the instruction of the destination to the second relay station.

Furthermore, since the communication between the second relay station and the reception side facsimile machine is performed in accordance with ITU-T T30recommendation, it is not necessary to design a non-standard protocol. In addition, the communication can be performed widely with facsimile machines having the standard communication function.

If the second relay station is controlled by the electronic mail address of the Internet, by converting the electronic mail address of the second relay station and the telephone number of the final destination into the MIME format under the electronic mail relay transmission mode to the second relay station, the content of the instruction via the public line such as a telephone line can be transmitted to the second relay station connected to the Internet. In addition, converting into the MIME format as an electronic mail defined by IETF enables communication with current electronic mail terminals. The first relay station is not required to have complicated information for controlling relay path for establishing a simple relay system.

The present invention can be applied to either a system including plural devices (e.g., a host computer, interface devices, readers and printers) or an apparatus including only one device (e.g., a copying machine or a facsimile machine).

The object of the present invention can be achieved also by installing a storage medium memorizing program codes of the software for realizing the function mentioned above into the system or the apparatus, so that a computer (CPU or MPU) of the system or the apparatus can read the program codes out of the storage medium and perform the program codes.

In this case, the program code itself that is read out of the storage medium performs the function of the embodiment explained above, and the storage medium is to constitute the present invention.

The storage medium for supplying the program codes may includes a flexible disk, a hard disk, an optical disk, a CD-ROM, a CD-R, a magnetic tape, a non-volatile memory card, and a ROM, for example.

The function of the embodiment mentioned above can be realized not only by the program code that is read out by the computer, but also by an operating system (OS) working on the computer. In this case, the OS may perform a part of the process or the entire process in accordance with the instruction of the program code so as to perform the above-mentioned function.

The function of the embodiment mentioned above can be realized by the following configuration, too. The program codes that is read out of the storage medium may be loaded into a memory of an extension board installed in the computer or of an extension unit connected to the computer. Then, the CPU of the extension board or the extension unit performs a part or all of the process in accordance with the program codes, so as to perform the above-mentioned function.

As mentioned above, according to the present invention, the communication control device, the communication method and the computer-readable memory can be provided, in which communication devices connected to a network environment including a public line and a computer network can communicate each other easily, and the communication cost can be reduced.

Next, another embodiment of the present invention will be explained in detail with reference to figures.

In the following explanation, a facsimile machine is used as an example of the data communication device.

Figure 29:
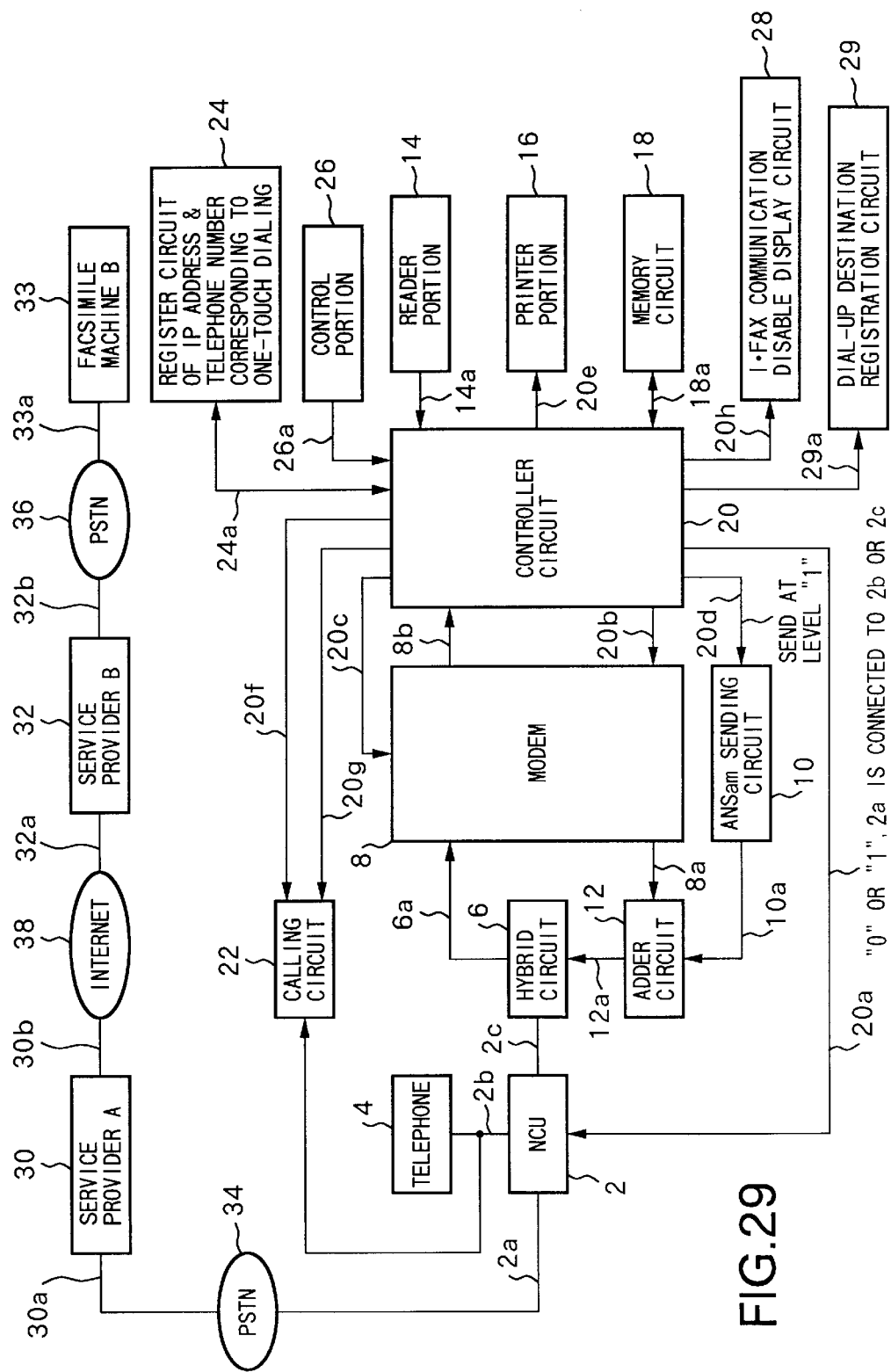
FIG. 29 is a block diagram of a system configuration according to the embodiment of the present invention.

FIG. 29 is a block diagram of the facsimile machine and an overall system for facsimile communication via a service provider of the Internet in accordance with the embodiment of the present invention.

In FIG. 29, the facsimile machine A includes the following parts 2 to 28.

Numeral 2 denotes a Network Control Unit (NCU) that switches connection of the telephone line (telephone network) to the telephone 4 or the facsimile communication portion (modem etc.), so as to use the telephone line connected to the facsimile machine for the data communication such as facsimile communication and normal speech communication, and controls connection of the telephone exchange network. The NCU 2 also has a circuit for capturing the line loop of the telephone line for the facsimile communication (data communication). In addition, the NCU 2 switches connection of the telephone line 2a to the telephone 4 or to the facsimile communication portion in accordance with the signal level of the control signal (signal line 20a) from the control circuit 20. If the signal level is "0", the telephone 4 is connected. If the signal level is "1", the facsimile communication portion is connected. Thus, in the normal state, the telephone line 2a is connected to the telephone 4.

Numeral 6 is a hybrid circuit that separates the signal of the transmission system from that of the reception system. The transmission signal from the adder circuit 12 is sent to the telephone line 2a via the hybrid circuit 6 and the NCU 2, while the reception signal from the other party is inputted to the modulator and demodulator portion (modem) 8 via the telephone line 2a, the NCU 2, the hybrid circuit 6 and the signal line 6a.

The modem 8 performs modulation of the transmission signal and demodulation of the reception signal. The modulation and demodulation functions confirm to ITU-T recommendation such as V.8, V.21, V.27ter, V.29, V.17 or V.34. The modem 8 works in the modulation/demodulation mode instructed by the control signal (signal line 20c) form the control circuit 20. The modem 8 modulates the transmission data given by the control circuit 20 via the signal line 20b, with the designated modulation mode, so as to output the modulated signal to the adder circuit 12, while it demodulates the reception signal given by the hybrid circuit 6 with the designated demodulation mode, so as to output the demodulated reception data to the control circuit 20 via the signal line 8b.

Numeral 10 is a circuit that sends the ANSam signal defined in V.8 standard in accordance with the control signal (signal line 20d) from the control circuit 20. The circuit 10 starts to send the ANSam signal when the level of the control signal is "1", and finishes sending the ANSam signal if the level of the control signal is "0".

Numeral 12 is an adder circuit that receives the signal from the modem 8 (signal line 8a) and the ANSam signal from the ANSam sending circuit 10 (signal line 10a), so as to add the signals and output to the hybrid circuit 6.

Numeral 14 is a reader portion that reads an original image optically so as to convert into an electric signal to be outputted. The reader portion 14 includes an image sensor, a mechanism for moving the original image or the sensor relatively to the other and a signal processor circuit for generating read data.

Numeral 16 denotes a printer portion for printing the image data onto a paper sheet, which includes a printer such as a laser beam printer or an ink jet printer.

Numeral 18 denotes a memory for memorizing data including read image data, transmission image data, reception image data.

Numeral 22 is a calling circuit that responds to a call instruction (signal line 20g) from the control circuit 20, inputs telephone number information (signal line 20f) from the control circuit 20, and perform calling operation (transmission of a selection signal such as a dialing signal) to the public service telephone network (PSTN) via the NCU 2 in accordance with the inputted telephone number information.

Numeral 24 is a register circuit of a telephone number corresponding to the one-touch dial key or the abbreviated dial key. When connecting the line to the service provider of the Internet, the IP address of the opposing service provider (the service provider connected to facsimile machine B of the reception side) and a telephone number of the reception side facsimile machine are registered in the register circuit 24 corresponding to the one-touch key. On the other hand, if the line is not connected to the service provider, a telephone number of the reception side facsimile machine is registered in the register circuit 24.

Numeral 26 is a control portion including various keys for setting various operation modes of the machine and for inputting instructions to control the machine, and a display for displaying states of the machine. The control portion 24 has one-touch dial keys, abbreviated dial keys, ten key, # key, * key and keys for registering the above-mentioned information in the registration circuit 24. These keys are pushed down by the operator and the inputted key information is given to the control circuit 20 via the signal line 26a.

Numeral 28 is a display circuit for displaying that the facsimile communication via the Internet cannot be performed since the information of the source telephone number cannot be received from the service provider. This display circuit 28 is illustrated as a separate block in FIG. 29. However, it can be combined with the operation portion 26. The display circuit 28 performs display on the basis of the control signal (signal line 20h) of the control circuit 20.

Numeral 29 is a registration circuit for registering a telephone number of the service provider A 30 to connect the line with the service provider A 30 and various information for receiving services of the service provider A.

Numeral 30 is the service provider A, which is a service provider of the Internet with which the facsimile machine A has contract as a subscriber to be provided with the service.

Numeral 32 is the service provider B, which is a service provider of the Internet whose service area includes the area where a facsimile machine B 33 is disposed. The service provider A and the service provider B are connected with each other via the Internet 38. The service provider A and the facsimile machine A are connected with each other via the public network (PSTN) 34, while the service provider B and the facsimile machine B are connected with each other via the public network (PSTN) 36.

The control circuit 20 controls the operation of the entire machine, and includes a microcomputer, a ROM storing the control program for the microcomputer, a RAM storing various operation modes (that is backed up by a backup circuit). The microcomputer controls entire machine by performing the control program stored in the ROM.

The above explanation is the general outline of the facsimile machine A and the communication system in accordance with embodiment of the present invention.

The facsimile machine A of the present embodiment connects the line to the service provider (as dial up) by calling automatically in accordance with the information registered in the registration circuit 29. The facsimile machine A performs facsimile communication with the service provider A, sets the information of the IP address of the service provider B and the telephone number of the facsimile machine B in the sub-address data in the facsimile communication procedure defined in the ITU T.30 recommendation in the facsimile communication so as to send the data. In this case, service provider A sent a facsimile procedure to the facsimile machine A, including information indicating whether setting of the above-mentioned information in the sub-address signal is possible or not. The facsimile machine A analyzes the received facsimile procedure. If the service provider A can receive the sub-address in which the above-mentioned information is set, information including the IP address corresponding to the one-touch dial key or the abbreviated dial key of the operation portion 26 that was pushed down and the telephone number of the facsimile machine of the reception destination are is set in the sub-address signal so as to send to the service provider A. Then, the image data is sent to the service provider A by facsimile communication. The service provider A analyzes the information set in the received sub-address signal, and judges whether the service provider corresponding to the IP address is the contracted one or not. If the service provider is the contracted one, it is judged whether the telephone number information of the source facsimile machine A (used for informing the source that the communication via the Internet was performed) was received correctly or not. If the service provider B corresponding to the IP address of the sub-address signal is the contracted one, the service provider A sends the image data received from the facsimile machine A to the service provider B as an affixed file of an electronic mail (its attribute is image data) via the Internet, while requesting the service provider B to inform of opening of the electronic mail when the image data as the affixed file of the electronic mail is sent to the facsimile machine B When the above-mentioned transmission of the electronic mail was finished, the service provider A informs the facsimile machine A that the communication of the image data via the Internet was finished, in the facsimile procedure (post process of facsimile). If the service provider corresponding to the IP address set in the sub-address signal is not a contracted one, the service provider A informs the facsimile machine A that the communication of the image data with the IP address via the Internet cannot be performed, in the facsimile procedure.

When receiving the information that the electronic mail did not reach the service provider correctly from the server of the Internet, the service provider A automatically call the telephone number of the source machine of the image data file affixed tot the electronic mail, so as to inform that the transmission of the image data via the Internet did not succeed, with information for recognizing the image data (such as a reception number, destination, date and time, and/or front page of the image data).

When receiving the information that the communication of the image data via the Internet cannot performed in the post process of the first facsimile communication, or the information of the communication failure from the service provider A in the later facsimile communication, the facsimile machine A displays the error in the image communication by the display circuit 28. It is possible to print out the error report by the printer portion 16 adding to the display.

When receiving the information from the service provider B that the electronic mail reached the service provider B, the service provider A automatically call the telephone number of the source machine of the image data file affixed to the electronic mail, so as to inform that the image data was received by (i.e., reached) the facsimile machine of the other party successfully, with information for recognize the image data, via the facsimile communication. The facsimile machine A performs dial-up monitor to the service provider A whether the image data reached the destination or not corresponding to each communication requesting the image data transmission via the Internet, and stores information (mark) indicating successful communication for the communication that the service provider A informed of the successful communication. When the operator instruct to print the information by the key input of the operation portion, a list of the information is printed by the printer portion 16. Thus, the operator can recognize which communication is still in the service provider that is in charge of the area of the destination machine.

In order to print the report of the management information, the operator operates a key of the operation portion 26 to select a mode of selecting the communication for printing that is still in the service provider of the destination area. Then the control circuit 20 searches information managing the relevant communication, and print out the report of the management information list concerning the relevant communication. Thus, the operator can telephone to the other operator to request extracting of the image data from the service provider, so that the image data sent via the Internet can reach the destination securely. In addition, the state of the sent image data can be monitored properly.

If the facsimile machine A has a display device such as a liquid crystal display that can display substantially detail information, the display device may display the same information as the above-mentioned report instead of or adding to the printing by the printer portion 26. In this case, the displayed communication may be pointed out when the telephone number of the destination is automatically called (if the telephone number is registered in the one-touch dial key of the destination), so that the operator can talk by the telephone 4 with the other operator easily.

The facsimile machine B may have either the same configuration as or the different configuration from the facsimile machine A.

The service provider B may call automatically to the facsimile machine B in accordance with a received telephone number information when receiving an electronic mail to which image data affixed for the destination of the telephone number of the facsimile machine B, while after connecting to the facsimile machine B, continues the facsimile communication, so as to send the image data file affixed to the received electronic mail to the facsimile machine B. In this case, then finishing the transmission to the facsimile machine B successfully, the service provider B sends information of the electronic mail reception to the service provider A via the Internet. The service provider A, when receiving the information of the electronic mail reception from the service provider B as mentioned above, informs the facsimile machine A via facsimile communication that the image data communication by the electronic mail was succeeded.

If the service provider B stores the received electronic mail in the accumulation memory of the service provider B as mentioned above, and the image data file affixed to the electronic mail in the accumulation memory is sent from the service provider B to the facsimile machine B responding to the polling from the facsimile machine B, the facsimile machine B connects the line to the service provider B by dial up, and the facsimile machine B extracts the image data for the destination from the service provider B. On this occasion, if the facsimile machine B has the same configuration as the facsimile machine A, a particular key may be assigned to the access information required for extracting the image data from the service provider B. After connecting to the service provider B by dial up, the particular key may be pushed down, so that the control circuit sets the access information registered to the key in the facsimile communication procedure to send the information to the service provider B. Then, the image data may be sent by polling from the service provider B to the facsimile machine B.

The above explanation is the overall operation of the system in accordance with the embodiment of the present invention.

FIGS. 30 to 33B are flowcharts of the operation performed by the control circuit 20 of the facsimile machine A (or the facsimile machine B). The program for performing the process shown in these flowcharts is stored in the ROM of the control circuit 20.

Figure 30:
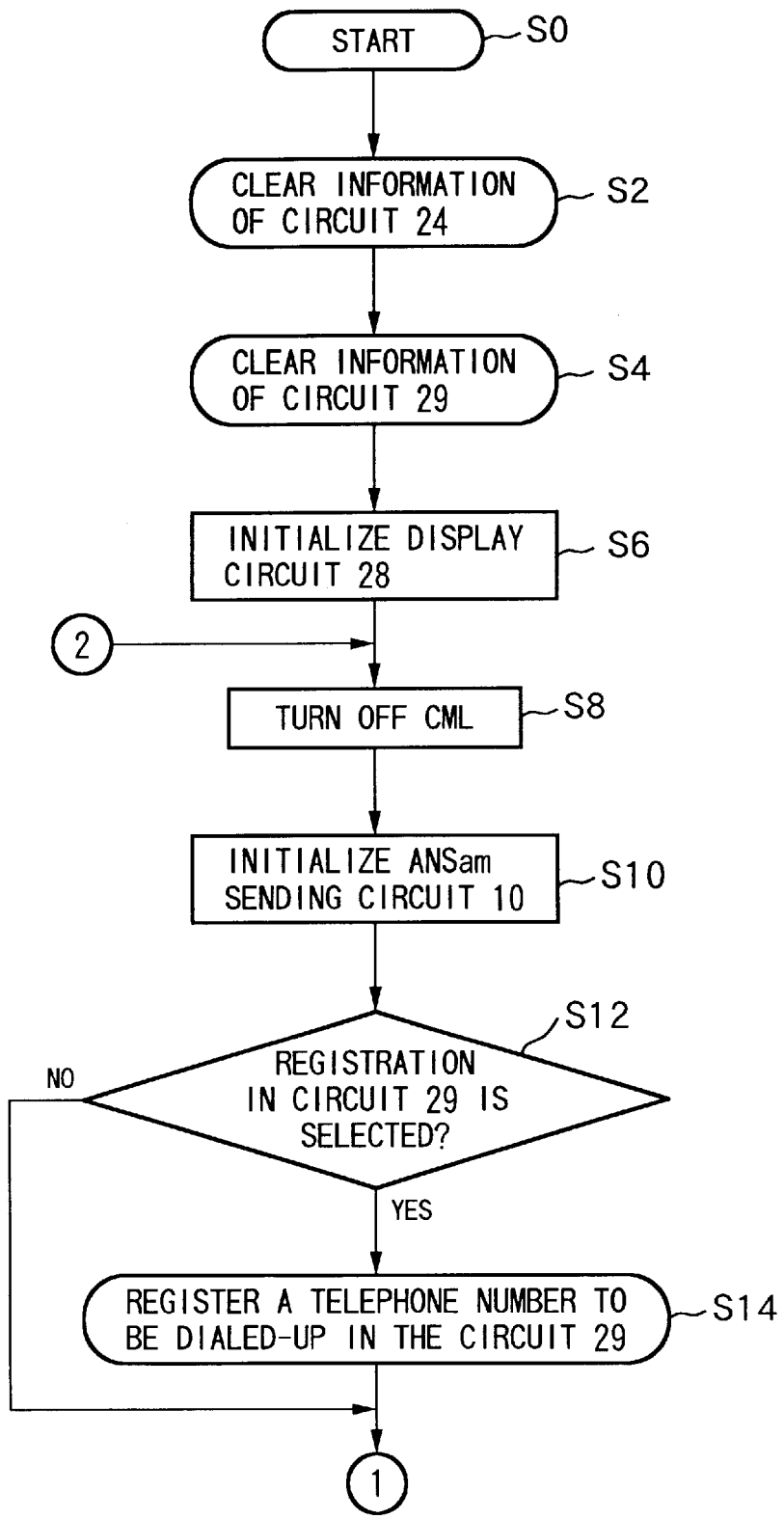
FIG. 30 is a flowchart of a control operation performed by a control circuit of the facsimile machine according to the embodiment of the present invention.
Figure 31:
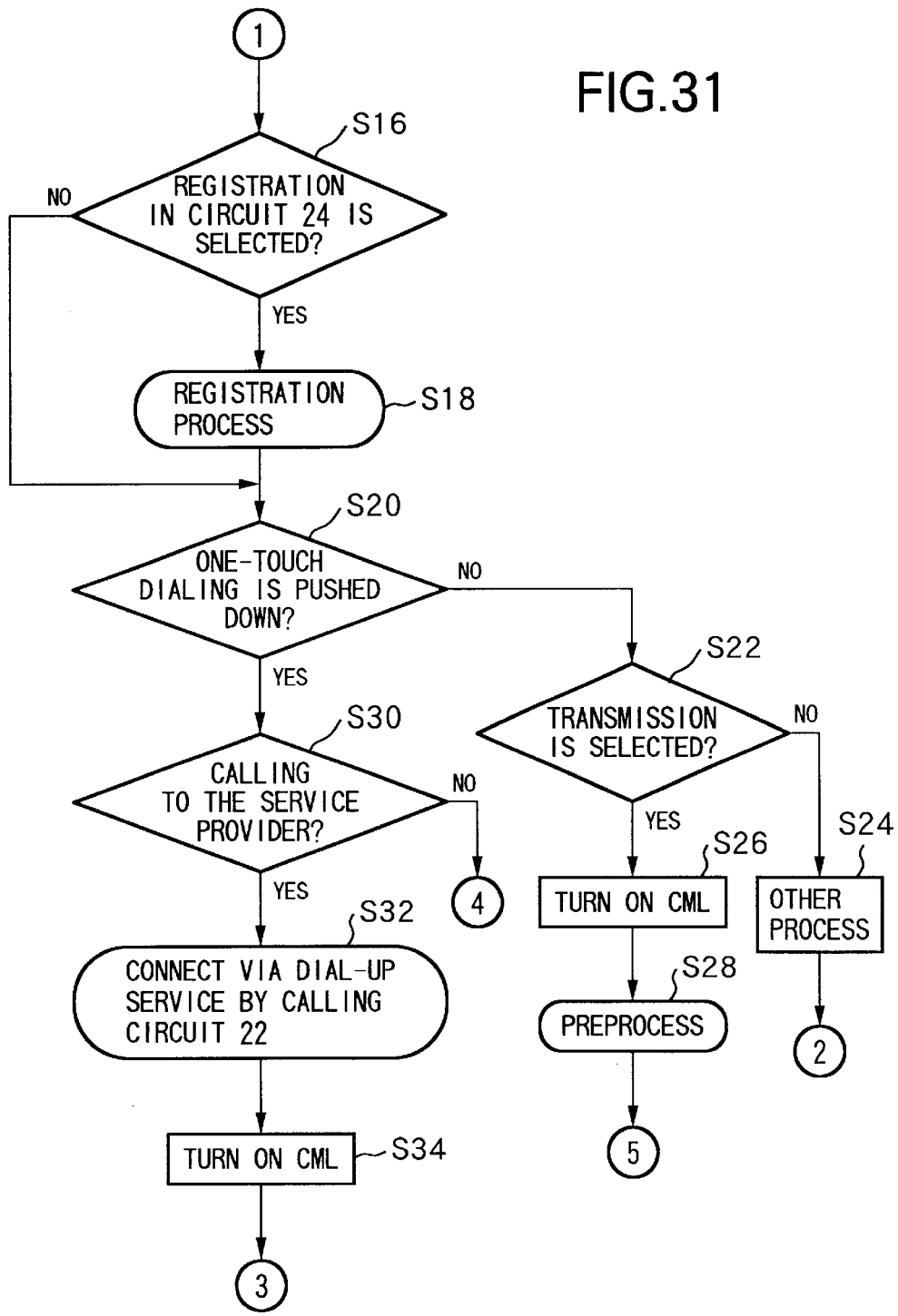
FIGS. 31 to 33B are flowcharts of control operation performed by a control circuit of the facsimile machine according to the embodiment of the present invention.
Figure 32:
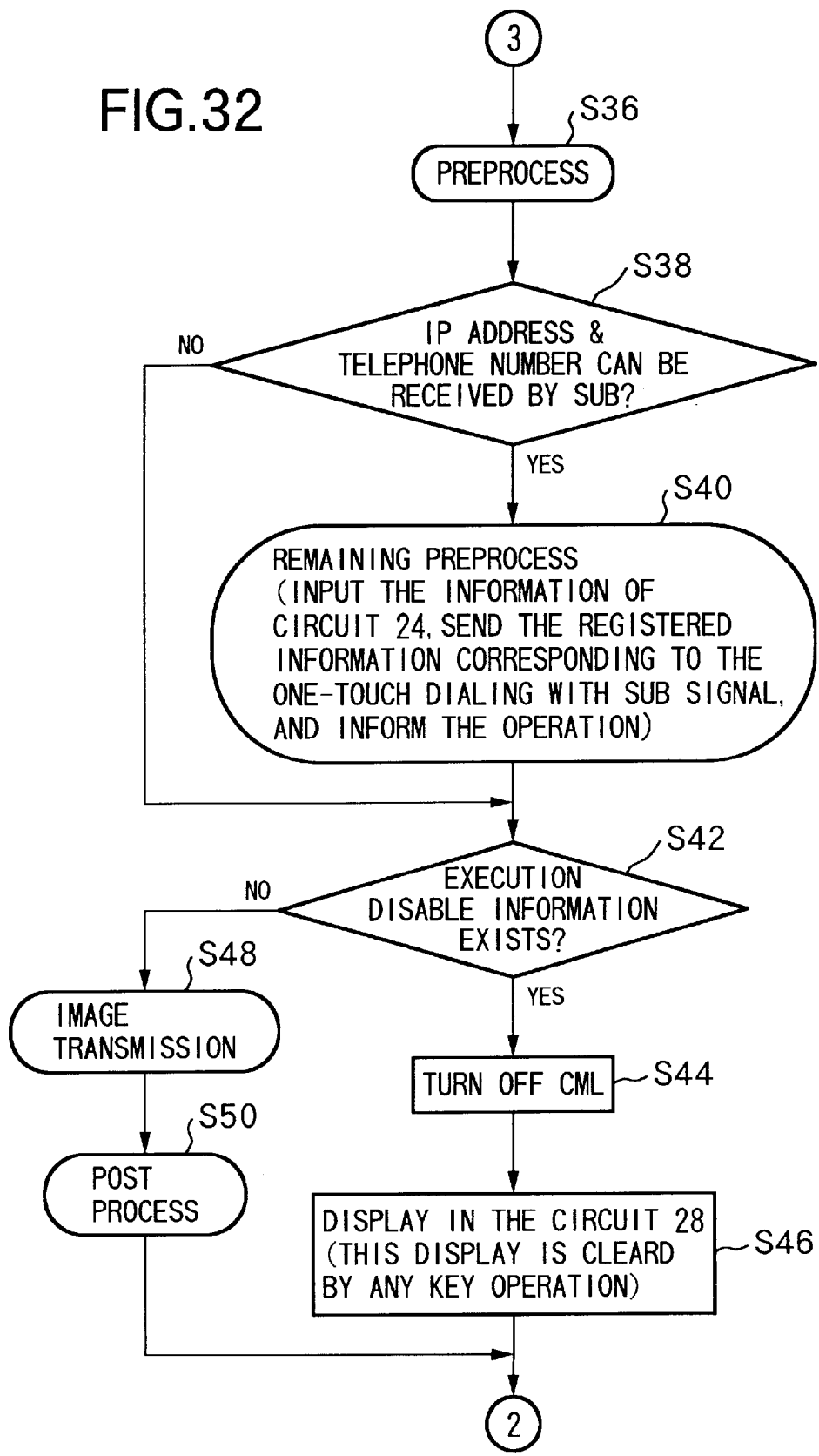
Figure 33A:
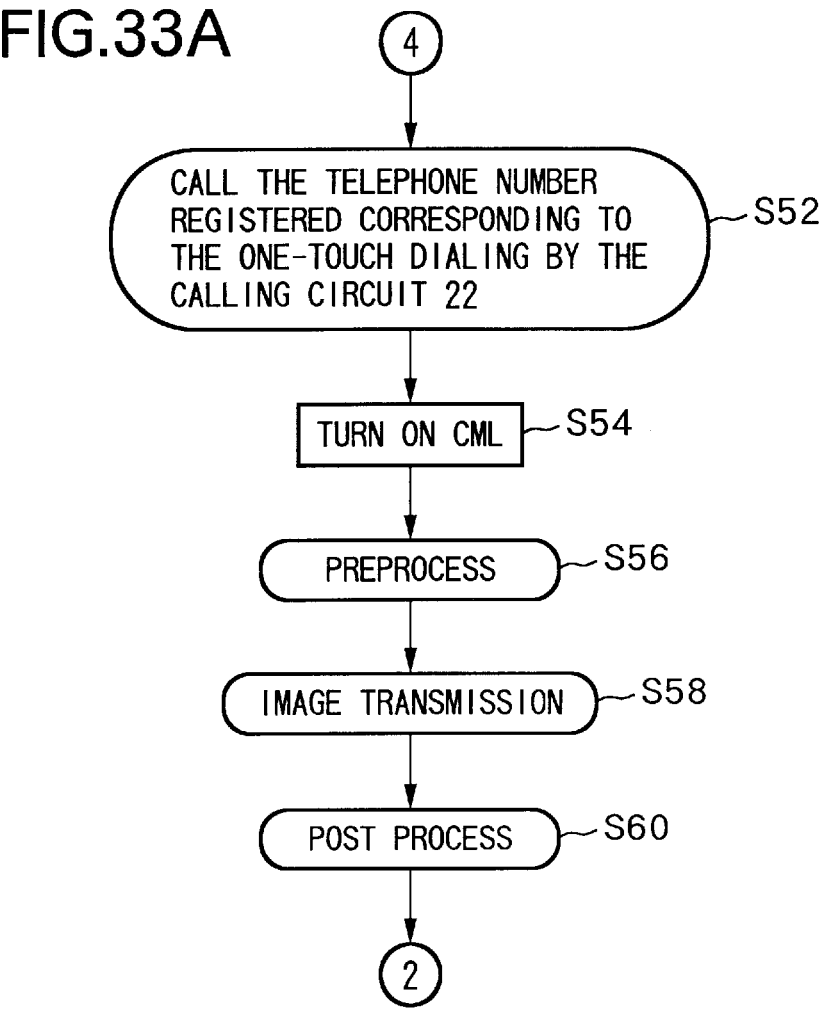
Figure 33B:
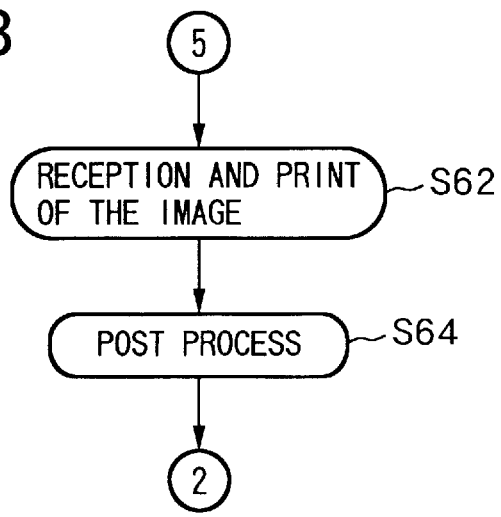

In the steps S2, S4, S6, S8 and S10 of FIG. 30, the control circuit 20 (microcomputer) initializes each part of the machine. The control circuit 20 initializes the registration circuit 24 and 29, and the display circuit 28, switches the CML relay of the NCU 2 to the telephone 4 side, and initializes the ANSam sending circuit 10.

In step S12, the control circuit 20 judges whether registration in the registration circuit 29 was selected or not by key input of the operation portion 26. If the registration in the registration circuit 29 was selected, the display device of the operation portion 26 displays a guidance information for inputting a telephone number and an access information to dial up to the service provider, in step S14. According to the guidance information, the telephone number and the access information are inputted by key input of the operation portion 26, and are registered in the registration circuit 29. After finishing of the registering process in the registration circuit 29, or if the registration in the registration circuit 29 is nor selected, the process goes to step S16.

In step S16, the control circuit 20 judges whether registration in the registration circuit 24 was selected or not by key input of the operation portion 26. If the registration in the registration circuit 24 was selected, the display device of the operation portion 26 displays a guidance information for the registration, in step S18. According to the guidance information, the information is inputted by the key of the operation portion 26, and is registered in the registration circuit 24. In this registration process, the operator first selects registration for calling to the service provider or registration for calling of normal facsimile communication. If the registration for calling to the service provider is selected, the control circuit 20 registers the above-mentioned information including an IP address and a telephone number of the reception side facsimile machine into the registration circuit 24 responding to the one-touch dial key assigned by key input of the control portion 25. If the registration for calling of normal facsimile communication is selected, the control circuit 20 registers the telephone number information of the other party into the registration circuit 24 responding to the one-touch dial key assigned by key input of the control portion 25.

If the registration into the registration circuit 24 is not selected in step S16, the control circuit 20 judges whether a one-touch key of the control portion 26 is pushed down or not, in step S20. If a one-touch key of the control portion 26 is not pushed down, it is judged in step S22 whether execution of the reception process is instructed (the case where the machine is set in automatic reception mode and received a calling signal from the line, or the case where the start key of the operation portion 26 is pushed down to instruct the reception) or not. If the execution of the reception process is instructed, the process goes to step S26 so as to execute the reception process. On the other hand, if the execution of the reception process is not instructed, the process goes to step S24 and returns to step S8 after executing the process.

When the control circuit 20 recognized a one-touch dial key pushed down, in step S20, the process goes to step S30, where the control circuit 20 judges whether the one touch dial key is pushed down after the above-mentioned particular key (i.e., whether the dial up to the service provider, the IP address and the telephone number information by the one-touch dial key are instructed or not). If it is judged that the one-touch dial key was pushed down after the dial up instruction to the service provider, the control circuit 20 reads out the information registered in the registration circuit 29, and the calling circuit 22 calls to the service provider in accordance with the read out information so that the dial up process is performed, in step S32.

The control circuit 20 activates the CML relay of the NCU 2 in step S34, receives the facsimile communication procedure signals (i.e., NSF·CSI·DIS signals of the ITU-T T30 recommendation) via the modem 8 in step S36, analyzes information of the received facsimile communication procedure signal in step S38, judges whether the service provider has a function for receiving the IP address and the reception side telephone number information by the SUB signal or not. If the service provider can receive the information of the IP address and the reception side telephone number by the SUB signal, the control circuit 20 reads out the IP address and the reception side telephone number information registered in the registration circuit 24, corresponding to the pushed one-touch dial key, in step S40, sets the read out information in the SUB signal, and sends the facsimile communication procedure signal (i.e., NSF·CSI·DIS signals of the ITU-T T30recommendation) via the modem 8. Then, the control circuit 20 executes a training check communication sequence before transmission of the image data.

If the service provider does not have the reception function of the information of the IP address and the telephone number by the SUB signal, the process of the control circuit 20 goes to step S42.

If the service provider has the reception function of the information of the IP address and the telephone number by the SUB signal, and the information of the IP address and the reception side telephone number is set in the SUB signal to send, the service provider analyzes the information set in the received SUB signal, and judges whether the service is supported (i.e., can be performed) in the service provider or not. If the service is not supported, an FTT signal that indicates an error is sent in the communication sequence of the training check performed in step S40, and the NSF·CSI·DIS signals are sent again so as to inform that the service is not supported, by the transmitted NFS signal.

In step S42, the control circuit 20 judges whether the service provider informed that the service was not supported. If the service provider informed that the service was not supported, the control circuit 20 turn off the CML relay of the NCU 2 in step S44, and display a message indicating that the communication via the Internet is not possible, in the display circuit 28, in step S46. When the control circuit 20 recognizes that any key of the operation portion 26 is pushed down, the display of the above-mentioned message by the display circuit 28 is finished. In this case, the operator has to do the operation for invalidating the registration of the one-touch dial key since the facsimile transmission via the Internet corresponding to the reception side telephone number cannot be performed. Therefore, the control circuit 20 make the display device of the control portion 26 display a message asking whether the registered information of the corresponding one-touch dial key should be invalidated or not. If the operator selects the invalidation by key input of the control portion 26, the control circuit 20 invalidates the information registered in the registration circuit 24 corresponding to the one-touch dial key. Though the invalidation process of the registered information is executed when the operator selects the invalidation process by key input, it is possible to execute the invalidation process automatically without the operator's selecting operation.

If the service provider did not inform that the service was not supported, the control circuit 20 executes the transmission process of the image data via the modem 8 in step S48 that was read by the reader portion 14, in accordance with the transmission mode set in the facsimile communication procedure performed in steps S36 and S40. Then, the control circuit 20 executes the post process in the facsimile communication procedure in step S50 (i.e., the process of checking whether the transmitted image data is received by the other party successfully or not, and of releasing the line after the facsimile communication). After the post process, the process returns to step S8.

If the dial up to the service provider is not selected in step S30, the control circuit 20 read out the information of the telephone number registered in the registration circuit 24 corresponding to the pushed one-touch dial key, so that the calling circuit calls in accordance with the read out telephone number information, in step S52. Then, the control circuit 20 turns on the CML relay in step S54, executes the preprocess of the facsimile communication procedure (process to the communication sequence of the training check of the T30 recommendation) in step S56, sends the image data read by the reader portion 14, in step S58, and executes the post process of the facsimile communication procedure in step S 06. Then, the process returns to step S8.

When the reception is instructed in step S22, the control circuit 20 turns on the CML relay in step S26, and executes the preprocess of the facsimile communication procedure in step S28. In this preprocess, the NSF·CSI·DIS signals are sent first, and the NSS·TSI·(SUB)·DCS signals are received from the other party. In this received procedure signals, when the above-mentioned result information about the image sent by facsimile to the service provider before is received, the result information is stored in the communication management information corresponding to the communication.

If the preprocess executed in step S28 is the process for the normal facsimile reception, the control circuit 20 executes the reception process of the image data (including the printing process of the received image data by the printer portion 16) in step S62, and performs post process in step S64. Then, the process returns to step S8.

In the above-mentioned step S24, if printing of the communication management information is selected, the control circuit 20 makes the printer circuit 16 print the above-mentioned report information. When printing the report, if the mode for searching and send image data that reached the other party successfully or still in the service provider of the reception side, is selected by key input of the operation portion 26, each corresponding information is extracted from the communication management information concerning to the plural communication in the memory 18,in accordance with the selected mode, so that the printer portion 16 print the report.

FIGS. 34, 35, 36A–36C and 37 are flowcharts of the process performed by the computer program in the service provider. The system of the service provider includes a line interface for connecting a telephone line, an interface for connecting to the Internet, a computer, a storage medium such as a hard disk for storing computer programs such as an application program, a control portion having a pointing device and a key board, and a CRT display.

Figure 34:
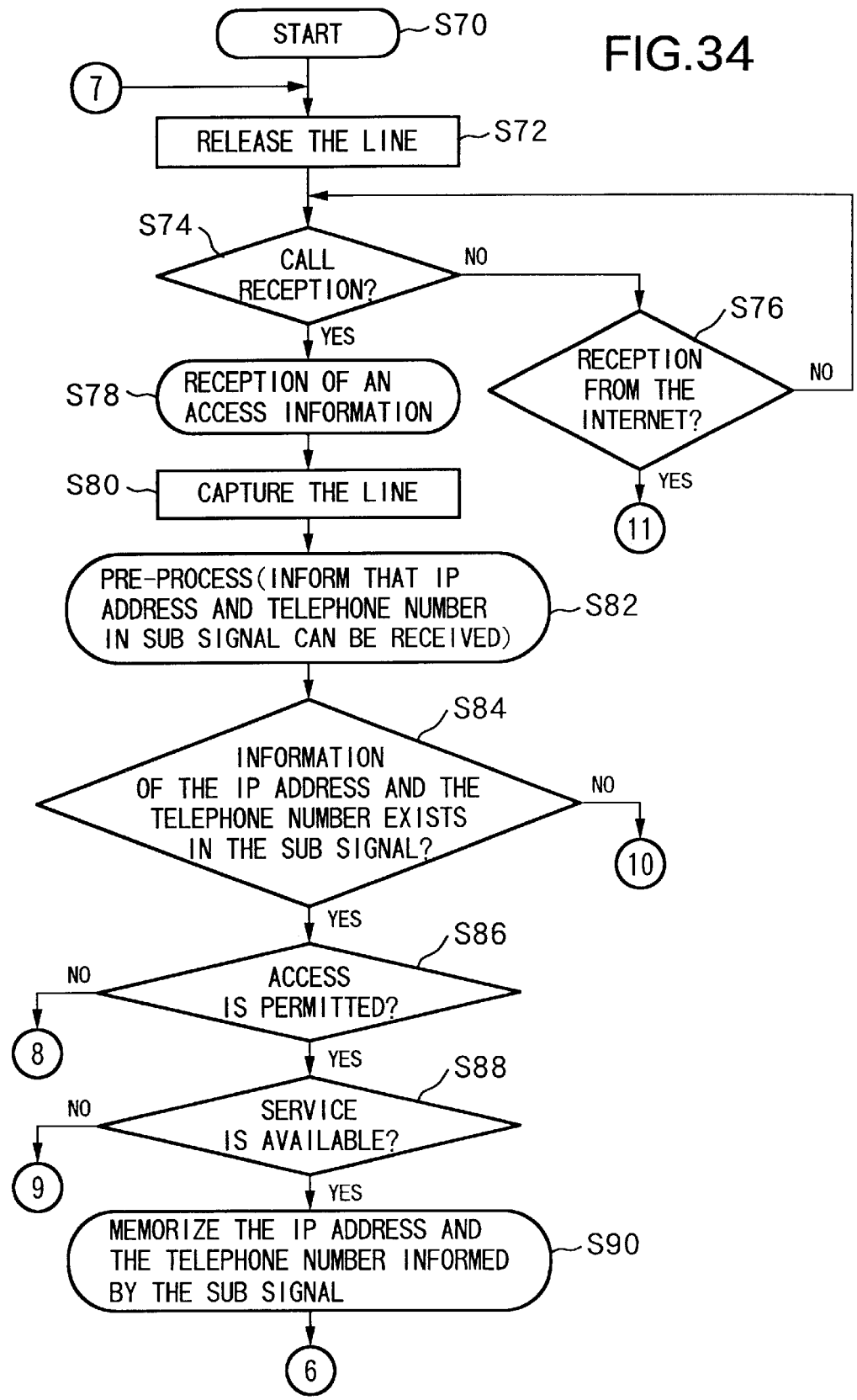
FIGS. 34 to 37 are flowcharts of control operation performed by a computer of the service provider according to the embodiment of the present invention.
Figure 35:
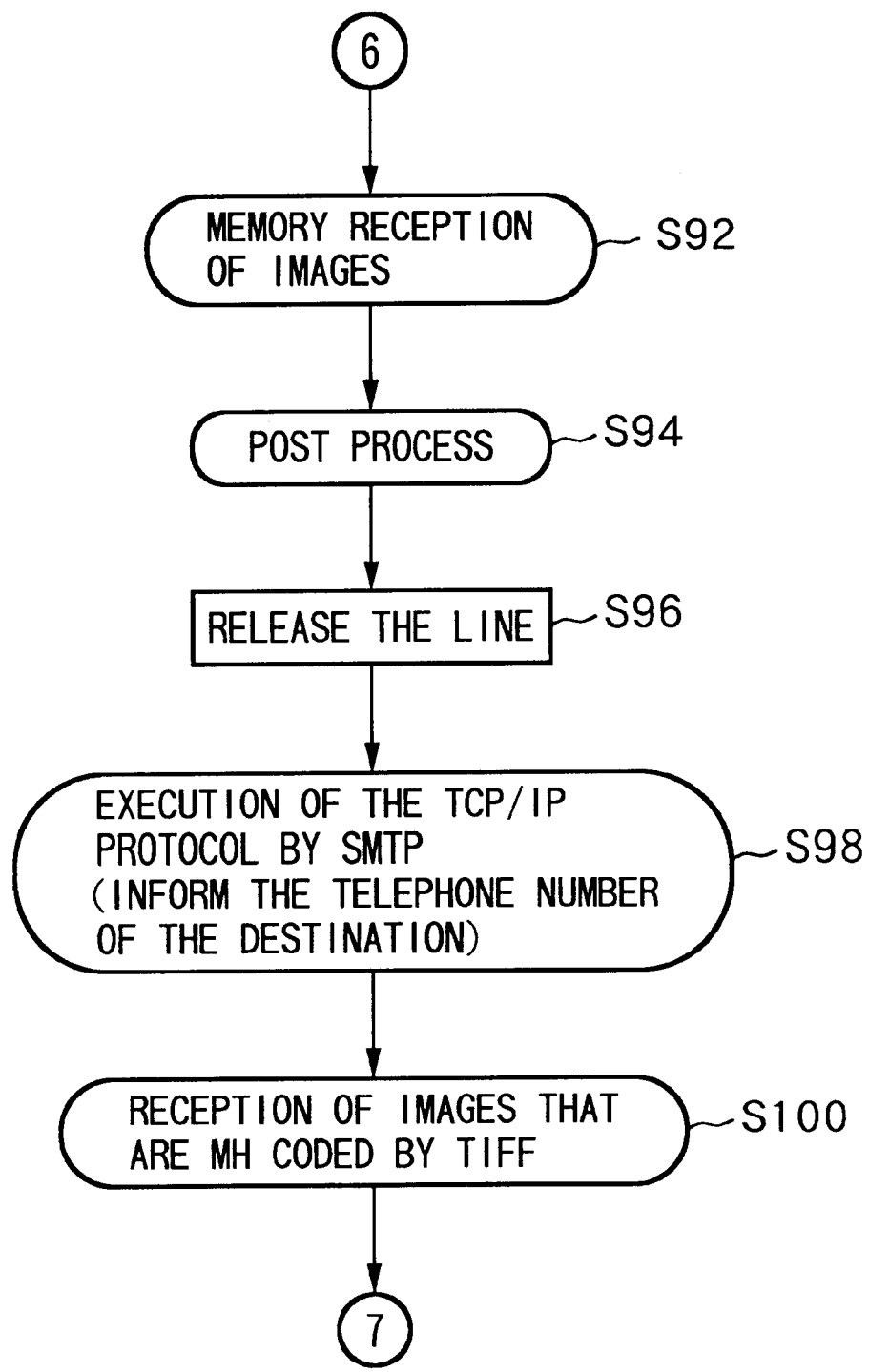
Figure 36A:
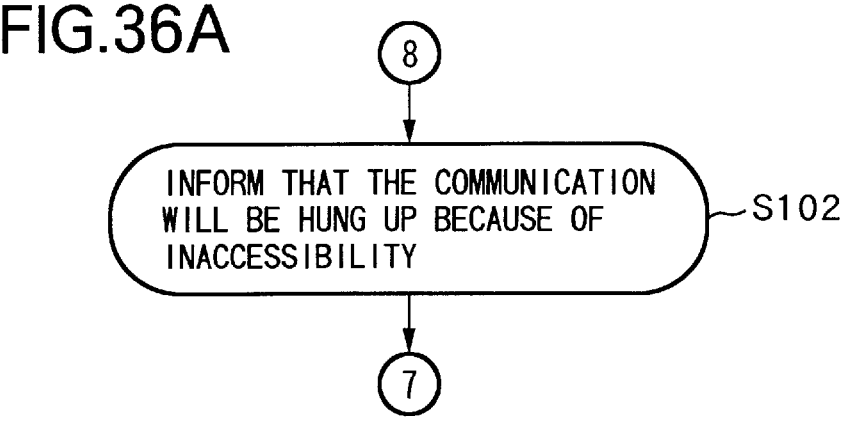
Figure 36B:
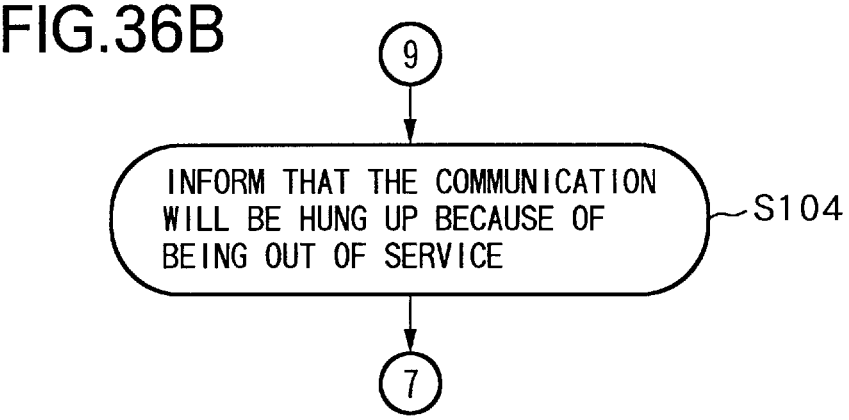
Figure 36C:
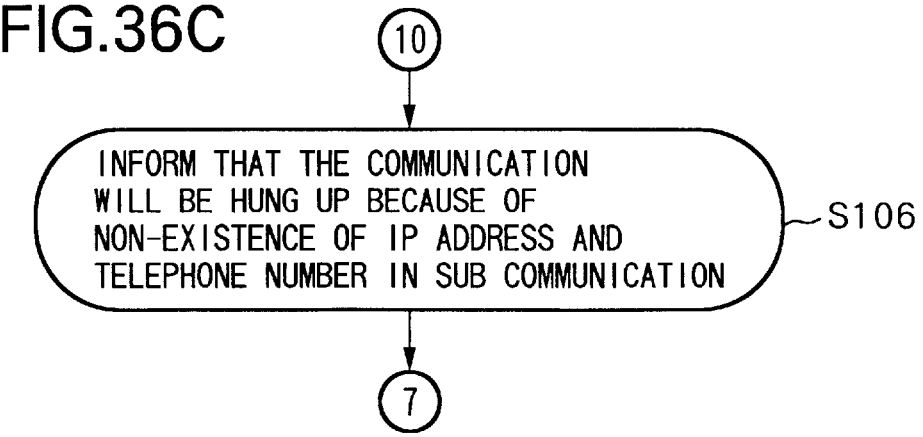
Figure 37:
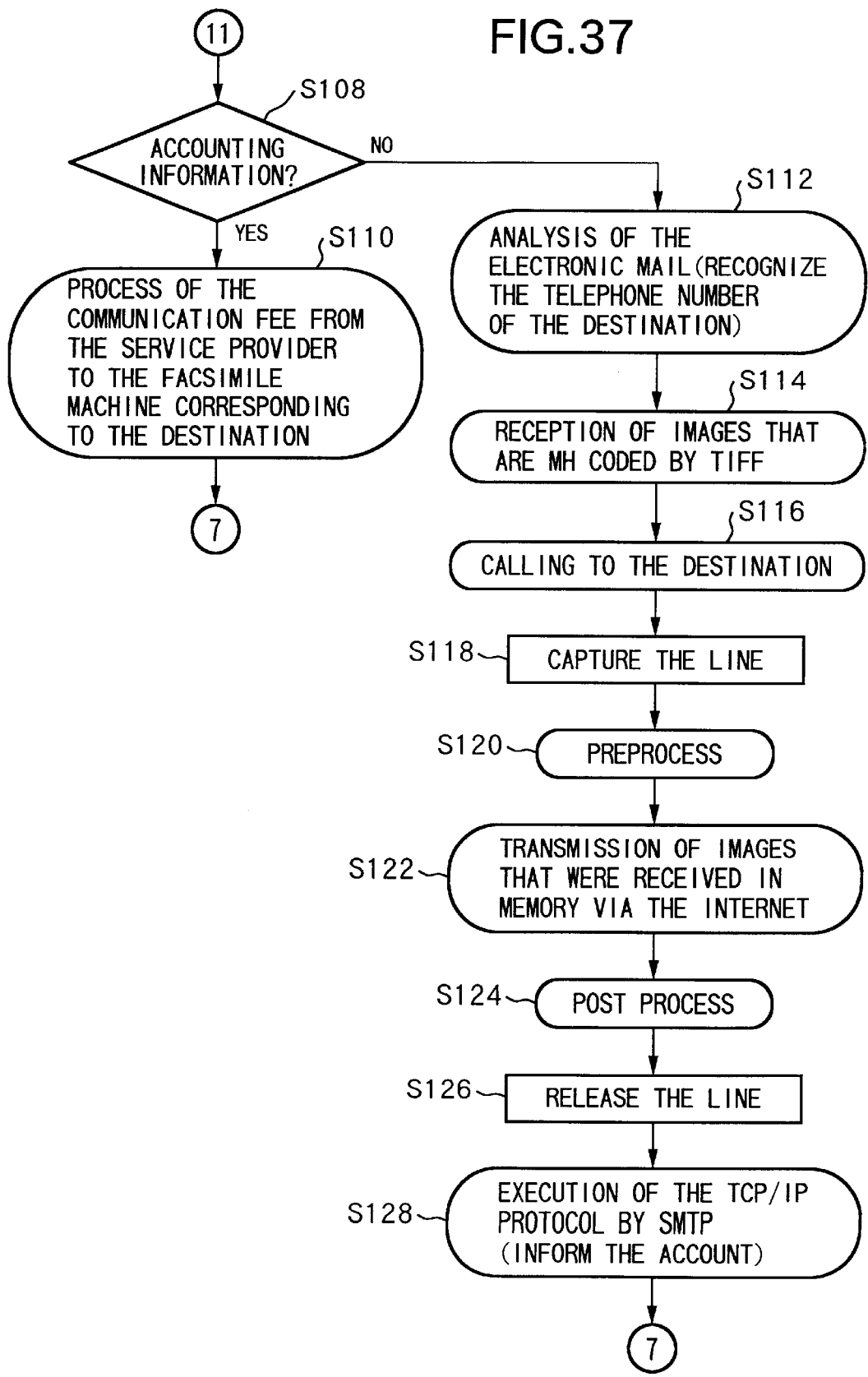

In step S72 of FIG. 34, release of the telephone line is instructed to the line interface. Then, it is judged in steps S74 and 75 whether an incoming call from the telephone line is detected or not (whether an incoming call detection signal from the line interface is received or not), and whether an electronic mail from the Internet is received or nor. If the incoming call from the telephone line is detected, access information (including a telephone number and an access permission number) is received in step S78. This access information can be caller identification from the exchanger of the telephone network. In this case, if the received access information assigns the facsimile communication (the access information includes an information for assigning a normal electronic mail communication or a facsimile communication, so as to execute the communication assigned by the source), the process goes to step S80 so as to start the facsimile reception process. Then, it is judged whether the access information received before can be permitted or not. If the access information can be permitted, the facsimile communication procedure signals (i.e., NSF·CSI·DIS signals) are sent, so as to inform in this NSF signal that the IP address and the telephone number can be received by the SUB signal. Then the control circuit receives the facsimile communication procedure signals (i.e., NSS·TSI·(SUB)·DCS signals) from the other party, checks whether the SUB signal is received or not, analyze the IP address and the telephone number set in the SUB signal if the SUB signal is received, in step S84, and judges whether the access information received before can be permitted or not, and whether the received IP address and telephone number are for available service or not, in steps S86 and S88.

If it is judged that the access cannot be permitted, in step S86, the FTT signal is sent in step S102 that indicates a failure in the training as a response signal to the communication sequence of the training check executed in the preprocess. The NSF·CSI·DIS signals are sent again to inform that the communication will be finished because of inaccessibility, and the process returns to step S72 to finish the communication.

If it is judged that the received IP address and telephone number are not for available service, so the communication cannot be executed, in step S88, the FTT signal is sent in step S104 that indicates a failure in the training as a response signal to the communication sequence of the training check executed in the preprocess. Then, the NSF·CSI·DIS signals are sent again to inform that the communication will be finished because it is out of service, and the process returns to step S72 to finish the communication.

If the SUB signal is not received in step S84, the FTT signal is sent in step S106 that indicates a failure in the training as a response signal to the communication sequence of the training check executed in the preprocess, since the information of the IP address and the telephone number could not be received by the SUB signal. Then, the NSF·CSI·DIS signals are sent again to inform that the facsimile reception cannot be performed, and the process returns to step S72 to finish the communication.

If the access can be permitted, and the received IP address and telephone number are for available service, in steps S86 and S88, the information of the IP address and the telephone number of the source informed by the SUB signal is stored in step S90, and the image data is received in step S92. The received image data is stored in the accumulation memory. The post process of the facsimile communication is performed in step S94. After releasing the telephone line by the line interface in step S96, the TCP/IP protocol is performed by the SMTP for sending the electronic mail via the interface of the Internet, in step S98. The telephone number information of the source and the received image data file stored in the accumulation memory are affixed to an electronic mail to be sent, as an image data file encoded in MH of TIFF format. The electronic mail is sent to the service provider corresponding to the IP address received by the SUB signal, in step S100. After finishing the electronic mail transmission, the process goes back to step S72.

In step S76, if it is judged that the electronic mail is received from the Internet, the process goes to step S108, where it is judged whether the received electronic mail is an accounting information of the former image data transmission service in which the facsimile transmission was requested to the other service provider by electronic mail. If it is the accounting information, an accounting process is executed in accordance with the accounting information, and an automatic call is executed by the line interface to the source corresponding to an identification included in the accounting information (i.e., the identification for distinguish the asked facsimile transmission). Thus, the successful end of the facsimile transmission is informed by the facsimile communication, and the process goes back to step S72.

If the received electronic mail is not the accounting information, in step S108, the electronic mail received by TCP/IP protocol via SMTP is analyzed, so as to judge whether a facsimile transmission is requested or not. If a facsimile transmission is requested, it is judged whether the image data affixed to the received electronic mail as an image file of TIFF format can be sent or not to the destination of the telephone number indicated in the electronic mail (i.e., whether the service can be performed or not). If the service can be performed, the process goes to step S116, where the line interface calls automatically in accordance with the assigned telephone number information. In step S118, the telephone line is connected to the other party that was called, and the image data affixed to the electronic mail is sent to the other party by facsimile communication in steps S120, S122 and S124. After successful end of the facsimile transmission, the line is released in step S126, an account information for the executed facsimile transmission is generated in step S128, and the account information is sent by electronic mail to the service provider who requested the service.

If the facsimile transmission in steps S120 to S124 was not succeeded, or if the other party was not connected to the line because the line was busy, redialing is performed in a predetermined interval so as to retry the facsimile transmission.

If the facsimile transmission failed after retrying predetermined times, it is informed to the service provider of the request source that the requested facsimile transmission failed, by electronic mail. The image data that was not sent successfully is stored in the accumulation memory of the service provider for a predetermined period.

The computer of the service provider who was informed of the failed communication automatically calls to the source of the facsimile transmission, so as to inform of the communication error along with the identification for specifying the facsimile transmission requested before, by facsimile communication.

When receiving the information of the communication error, the facsimile machine of the source generates the DFTM signal by using the ten key of the operation portion 26 after the dial up operation mentioned above, for requesting resending. Thus, the request for resending of the image data that was failed to send and stored in the accumulation memory of the destination side service provider, can be performed via the closest service provider.

The present invention can be embodied in various ways, not limited to the above-mentioned embodiment.

As explained above, according to the embodiment of the present invention, a facsimile machine can request a service provider of the Internet to transfer image data by facsimile communication via the Internet. Thus, an inexpensive facsimile communication can be provided.

In addition, according to the embodiment of the present invention, a facsimile machine of the source side can recognize the state of the image data that are transmitted by the facsimile transmission requested to the service provider.

Furthermore, if the requested facsimile transmission failed in the service provider, the service provider can store the image data of the failed facsimile communication for a predetermined period, and can perform resending of the facsimile transmission upon request of resending. Thus, the operation of the facsimile communication can be improved.

The present invention is not limited to the above embodiments and various changes and modifications can be made within the spirit and scope of the present invention. Therefore, to apprise the public of the scope of the present invention, the following claims are made.

What is claim is:

1. A communication apparatus having a relay function comprising:

first reception means for receiving at least a sub-address and transmission data;

first extracting means for extracting a relay destination for transferring the transmission data to a next relay destination and/or a final destination for transferring the transmission data from the next relay destination to the final destination, from the sub-address;

first transmission means for making an electronic mail including the transmission data and the final destination, and sending the electronic mail to the relay destination;

second reception means for receiving an electronic mail including at the final destination and transmission data;

second extracting means for extracting the final destination to which the transmission data is transferred, from a received electronic mail data; and second transmission means for sending the transmission data received as an electronic mail to the final destination through a telephone network, wherein the relay destination is assigned by data indicating an electronic mail address, and the final destination is assigned by data indicating a telephone number.

2. The communication apparatus according to claim 1, wherein the sub-address is defined by ITU-T T30, and the final destination is stored in a command region of a file described in MIME.

3. A network system to which at least a source communication apparatus, a first communication apparatus having a relay function working as a first relay station that transfers data received from a telephone network to a computer network, a second communication apparatus having a relay function working as a second relay station that transfers data received from the computer network to the telephone network, and a destination communication apparatus are connected, wherein the source communication apparatus includes first relay destination assigning means for assigning a first relay destination corresponding to the first communication apparatus that relays a transmission data, second relay destination assigning means for assigning a second relay destination corresponding to the second communication apparatus to which the transmission data is transferred from the first relay destination, final destination assigning means for assigning a final destination corresponding to the destination communication apparatus to which the transmission data is transferred from the second relay destination, and transmission means for sending at least the transmission data and a sub-address including the second relay destination and the final destination;

the first communication apparatus includes reception means for receiving at least the sub-address and the transmission data, extracting means for extracting the second relay destination and/or the final destination from the sub-address, and transmission means for making an electronic mail including the transmission data and the final destination, and sending the electronic mail to the second relay destination; and the second communication apparatus includes reception means for receiving the electronic mail including at least the final destination and the transmission data, extracting means for extracting the final destination from the electronic mail received by the reception means, and transmission means for sending the transmission data to the final destination, wherein the first relay destination is assigned by data indicating a telephone number, the second relay destination is assigned by data indicating an electronic mail address, and the final destination is assigned by data indicating a telephone number.

4. The network system according to claim 3, wherein the first relay destination is assigned by data indicating a telephone number, the second relay destination is assigned by data indicating an electronic mail address, the final destination is assigned by data indicating a telephone number, the sub-address is defined by ITU-T T30, and the final destination is stored in a command region of a file described in MIME.

5. A method for setting a destination in a network system to which at least a source communication apparatus, a first communication apparatus having a relay function working as a first relay station that transfers data received from a telephone network to a computer network, a second communication apparatus having a relay function working as a second relay station that transfers data received from the computer network to the telephone network, and a destination communication apparatus are connected, the method comprising the steps of:

in the source communication apparatus reading out first and second relay destinations corresponding to the first and second communication apparatuses registered in connection with a final destination, when the final destination is inputted for sending a transmission data, and sending data indicating the second relay destination and the final destination to the first relay destination by facsimile procedure;

in the first communication apparatus extracting the second relay destination for transferring the transmission data and the final destination for transferring the transmission data from the second relay destination, from a received sub-address, and making an electronic mail including the final destination, and sending the electronic mail to the second relay destination; and in the second communication apparatus extracting the final destination to which the transmission data is transferred, from the electronic mail received from the first communication apparatus, and sending the transmission data to the final destination, wherein the first relay destination is assigned by data indicating a telephone number, the second relay destination is assigned by data indicating an electronic mail address, and the final destination is assigned by data indicating a telephone number.

6. The method according to claim 5, wherein the communication apparatus is a facsimile machine, the final destination is inputted as data indicating a telephone number, the first relay destination is registered as data indicating a telephone number, the second relay destination is registered as data indicating an electronic mail address, the sub-address is defined by ITU-T T30, and the final destination is stored in a command region of a file described in MIME.

7. A communication method having a relay function comprising:

receiving at least a sub-address and transmission data;

extracting a relay destination for transferring the transmission data to a next relay destination and/or a final destination for transferring the transmission data from the next relay destination to the final destination, from the sub-address;

making an electronic mail including the transmission data and the final destination, and sending the electronic mail to the relay destination;

receiving an electronic mail including at the final destination and transmission data;

extracting the final destination to which the transmission data is transferred, from a received electronic mail data; and sending the transmission data received as an electronic mail to the final destination through a telephone network, wherein the relay destination is assigned by data indicating an electronic mail address, and the final destination is assigned by data indicating a telephone number.

8. The communication method according to claim 7, wherein the sub-address is defined by ITU-T T30, and the final destination is stored in a command region of a file described in MIME.

* * * * *